(12) United States Patent
Nakagawa et al.

(10) Patent No.: US 10,542,183 B2
(45) Date of Patent: Jan. 21, 2020

(54) IMAGE PROCESSING APPARATUS AND METHOD SETTING DOT ARRANGEMENTS TO REDUCE DIFFERENCES IN DISPERSIVENESS OF DOTS BETWEEN OVERLAPPING AND NON-OVERLAPPING RECORDING AREAS

(71) Applicant: CANON KABUSHIKI KAISHA, Tokyo (JP)

(72) Inventors: Junichi Nakagawa, Tokyo (JP); Akitoshi Yamada, Yokohama (JP); Okinori Tsuchiya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 15/902,928

(22) Filed: Feb. 22, 2018

(65) Prior Publication Data

US 2018/0244075 A1    Aug. 30, 2018

(30) Foreign Application Priority Data

Feb. 28, 2017 (JP) ................................ 2017-037740

(51) Int. Cl.
*H04N 1/52* (2006.01)
*B41J 3/54* (2006.01)
(Continued)

(52) U.S. Cl.
CPC .............. *H04N 1/52* (2013.01); *B41J 2/2132* (2013.01); *B41J 3/543* (2013.01); *G06K 15/102* (2013.01);
(Continued)

(58) Field of Classification Search
None
See application file for complete search history.

(56) References Cited

U.S. PATENT DOCUMENTS 6,020,976 A    2/2000  Fujita
6,511,143 B1 *  1/2003  Ishikawa ................ B41J 2/2132
                                          347/41
(Continued)

OTHER PUBLICATIONS

Theophano Mitsa et al.; "Digital halftoning using a blue noise mask;" Proc. SPIE, vol. 1452, Image Processing Algorithms and Techniques II (1991); pp. 47-56.
(Continued)

*Primary Examiner* — Scott A Rogers
(74) *Attorney, Agent, or Firm* — Canon U.S.A., Inc. IP Division

(57) ABSTRACT

An image processing apparatus performs quantization processing of first multivalued image data, second multivalued image data, and third multivalued image data using a dither pattern including a plurality of threshold pixels having threshold values respectively determined for quantization, generates first recording data by quantizing the first multivalued image data using a dither pattern having a threshold pixel arrangement satisfying a predetermined condition regarding the number of threshold pixels and a predetermined condition regarding low-frequency components corresponding to a frequency region lower than a predetermined frequency in spatial frequency characteristics corresponding to an arrangement of the threshold pixels, generates second recording data by quantizing the second multivalued image data using the dither pattern having the threshold pixel arrangement, and generates third recording data by quantizing the third multivalued image data using the dither pattern having the threshold pixel arrangement and the second multivalued image data.

19 Claims, 24 Drawing Sheets

(51) Int. Cl.
*H04N 1/60* (2006.01)
*G06K 15/02* (2006.01)
*H04N 1/191* (2006.01)
*B41J 2/21* (2006.01)
*G06K 15/10* (2006.01)

(52) U.S. Cl.
CPC ....... *G06K 15/1877* (2013.01); *H04N 1/1911* (2013.01); *H04N 1/6027* (2013.01); *G06K 2215/111* (2013.01)

(56) References Cited

U.S. PATENT DOCUMENTS

| | | | | |
|---|---|---|---|---|
| 8,152,262 | B2* | 4/2012 | Seccombe | B41J 2/5056 347/9 |
| 8,411,326 | B2* | 4/2013 | Inoue | B41J 2/155 358/1.13 |
| 8,610,955 | B2* | 12/2013 | Goto | H04N 1/52 358/1.9 |
| 9,302,471 | B2* | 4/2016 | Kobayashi | B41J 19/147 |
| 10,336,097 | B2* | 7/2019 | Yamada | B41J 2/51 |
| 2018/0134042 | A1* | 5/2018 | Tsuchiya | B41J 2/17566 |

OTHER PUBLICATIONS

Robert Ulichney; "The void-and-cluster method for dither array generation;" Proccedings SPIE, Human Vision, Visual Processing, Digital Displays IV, vol. 1913, pp. 332-343.

* cited by examiner

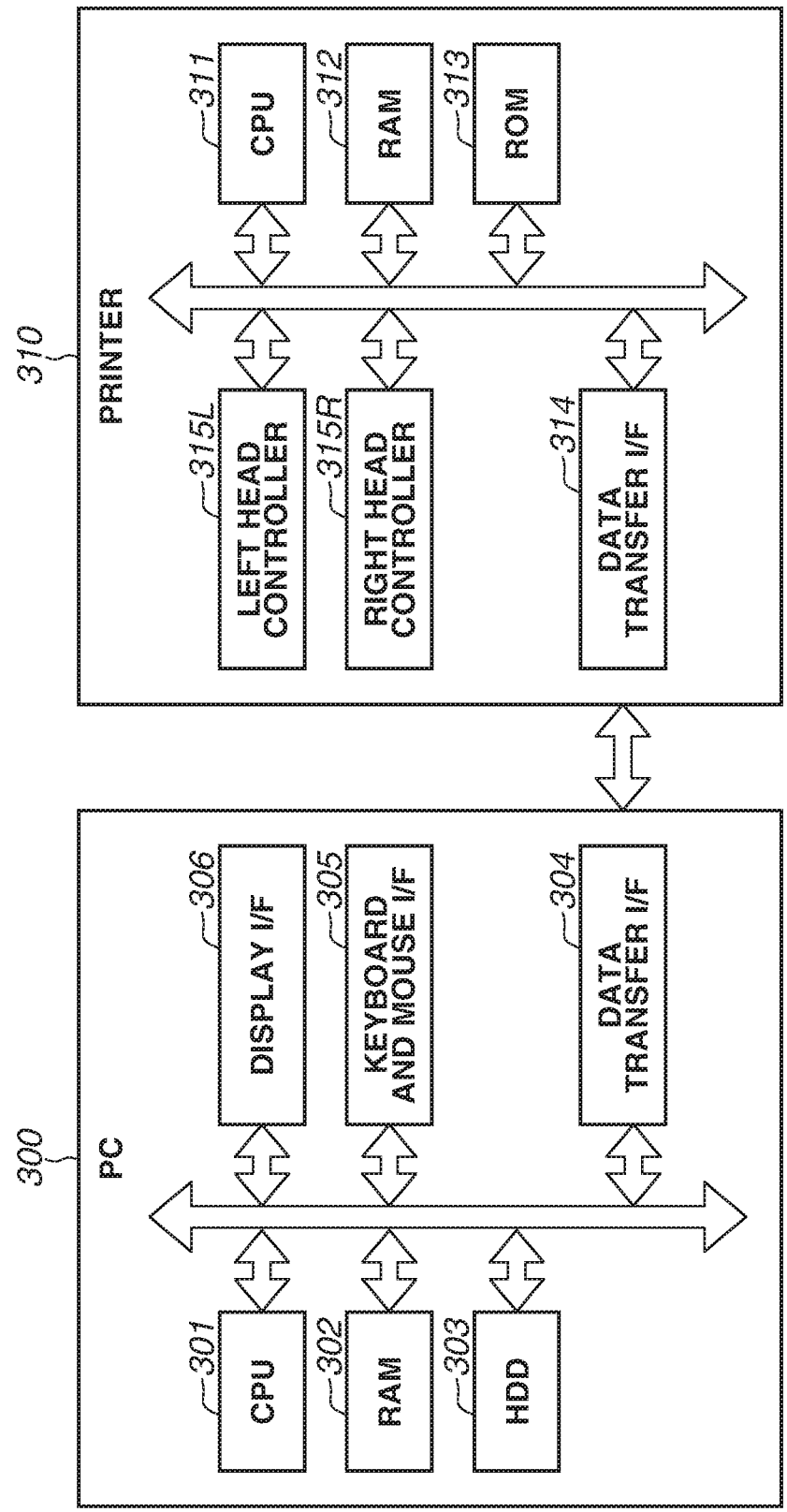

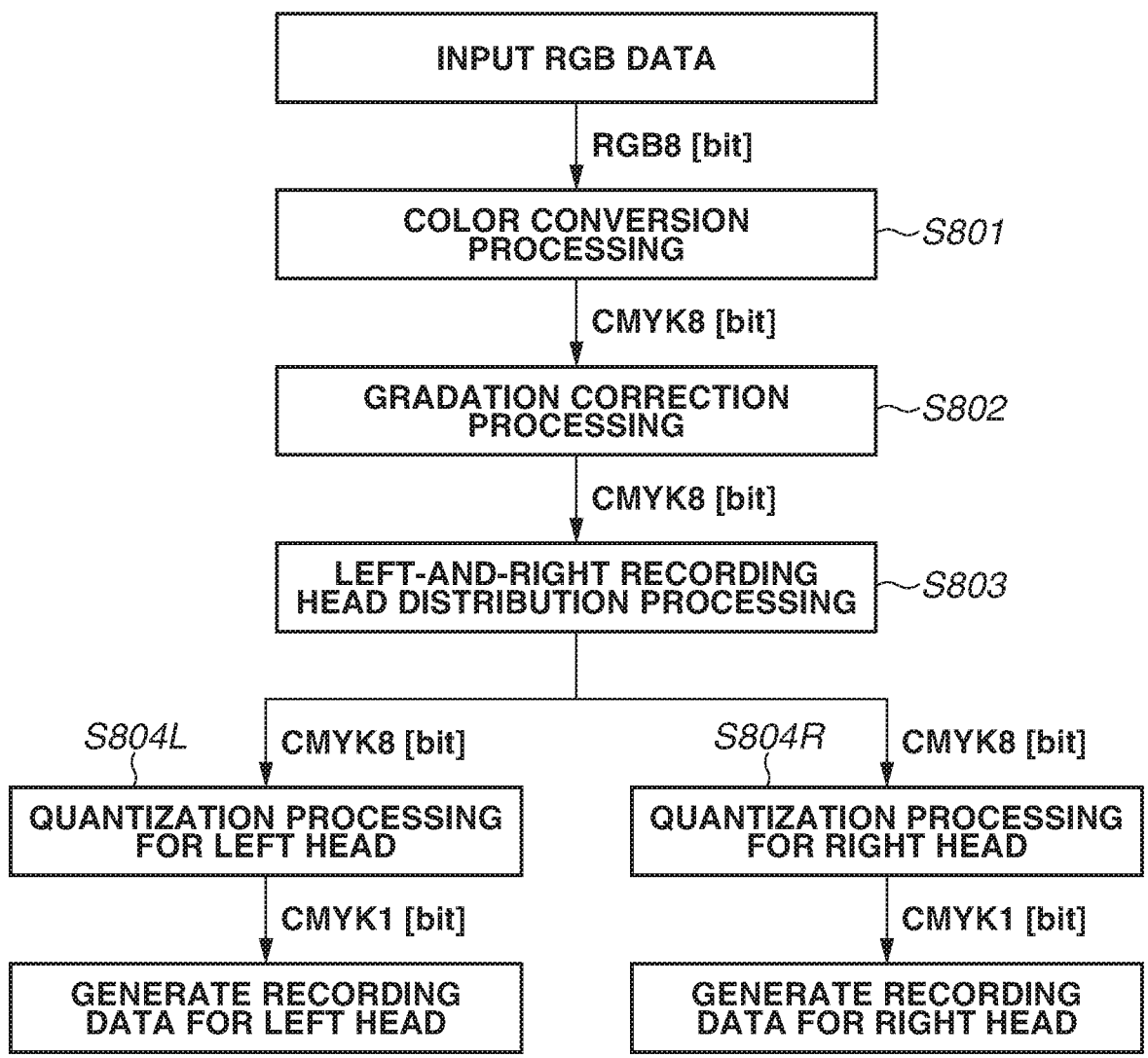

FIG.6A
| 16 | 144 | 80 | 208 |
|----|-----|----|-----|
| 224 | 32 | 160 | 96 |
| 112 | 240 | 48 | 176 |
| 192 | 128 | 255 | 64 |
FIG.6B
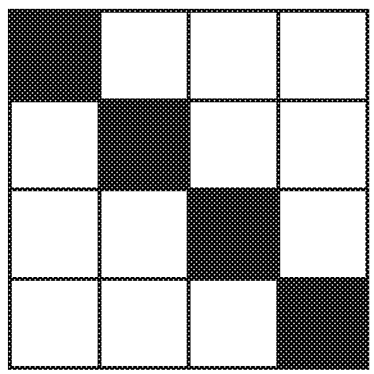
FIG.6C
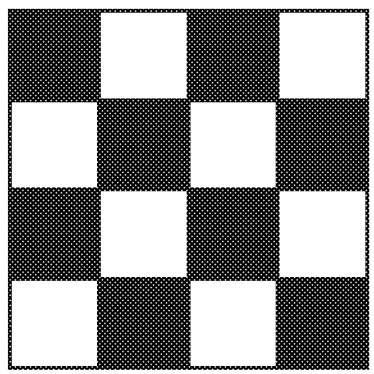

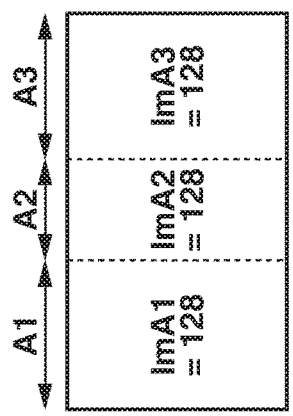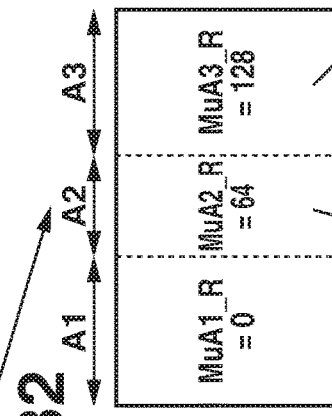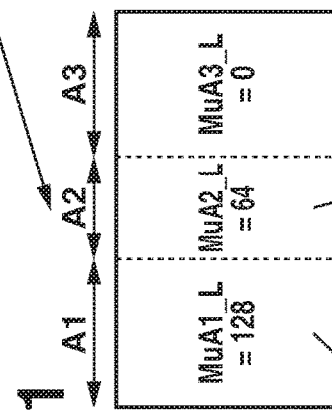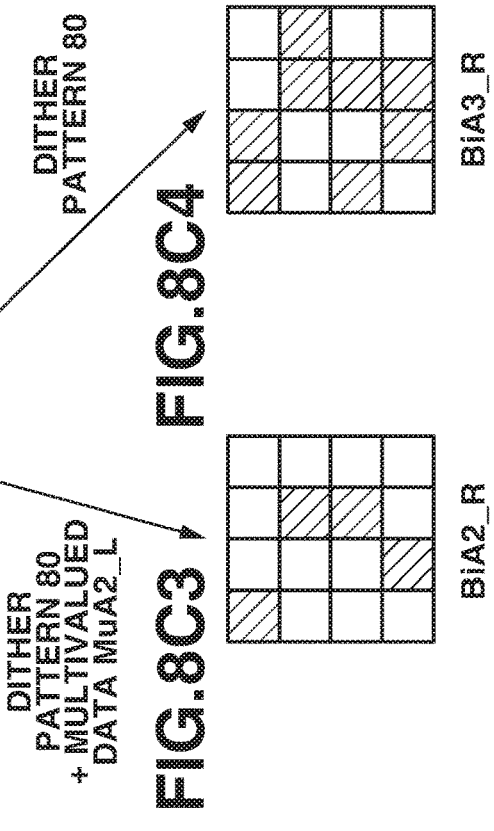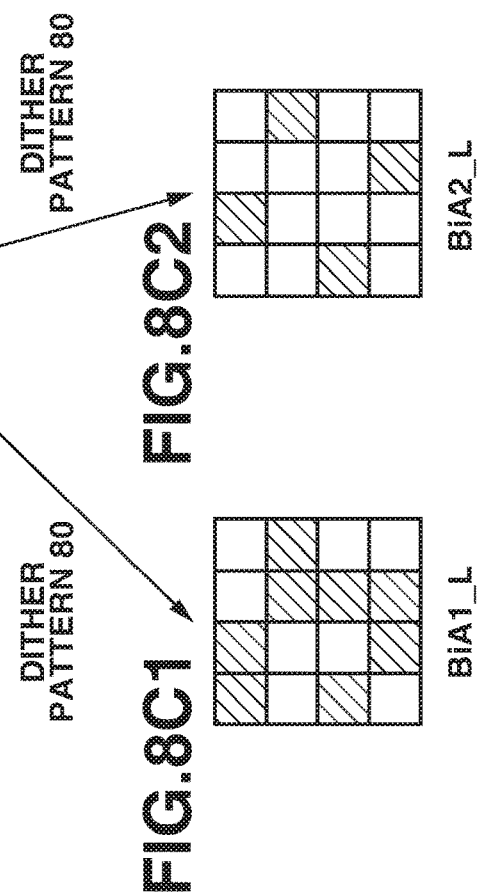

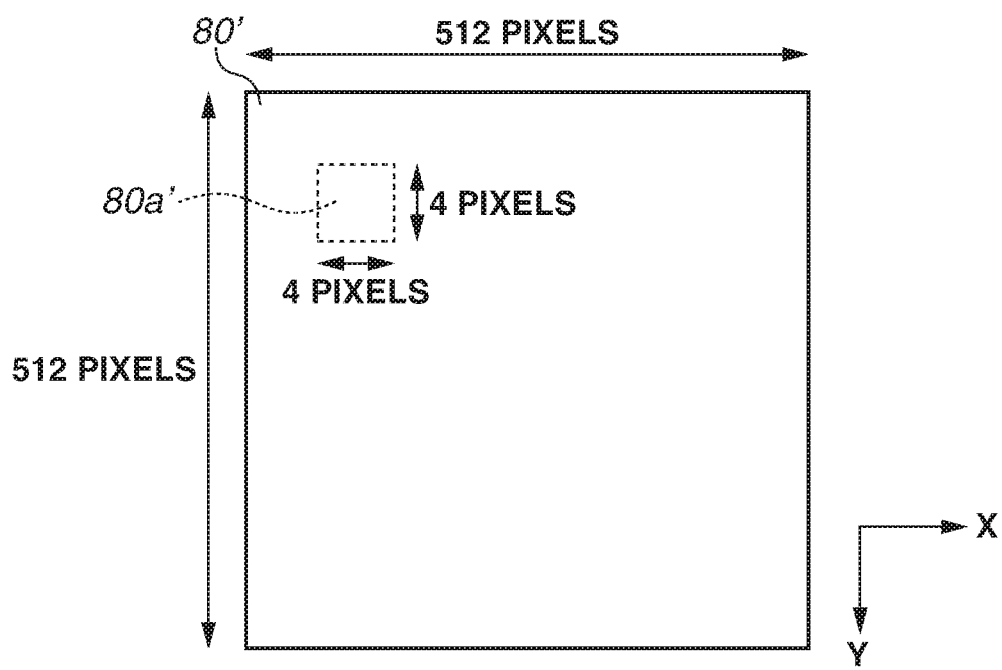

FIG.10A
FIG.10B
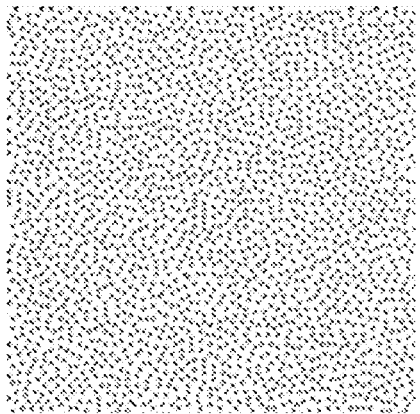
DOT ARRANGEMENT IN
AREA A2 FORMED BY
RECORDING HEAD 102L
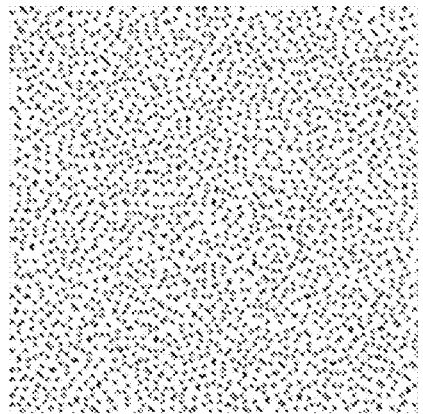
DOT ARRANGEMENT IN
AREA A2 FORMED BY
RECORDING HEAD 102R
FIG.10C
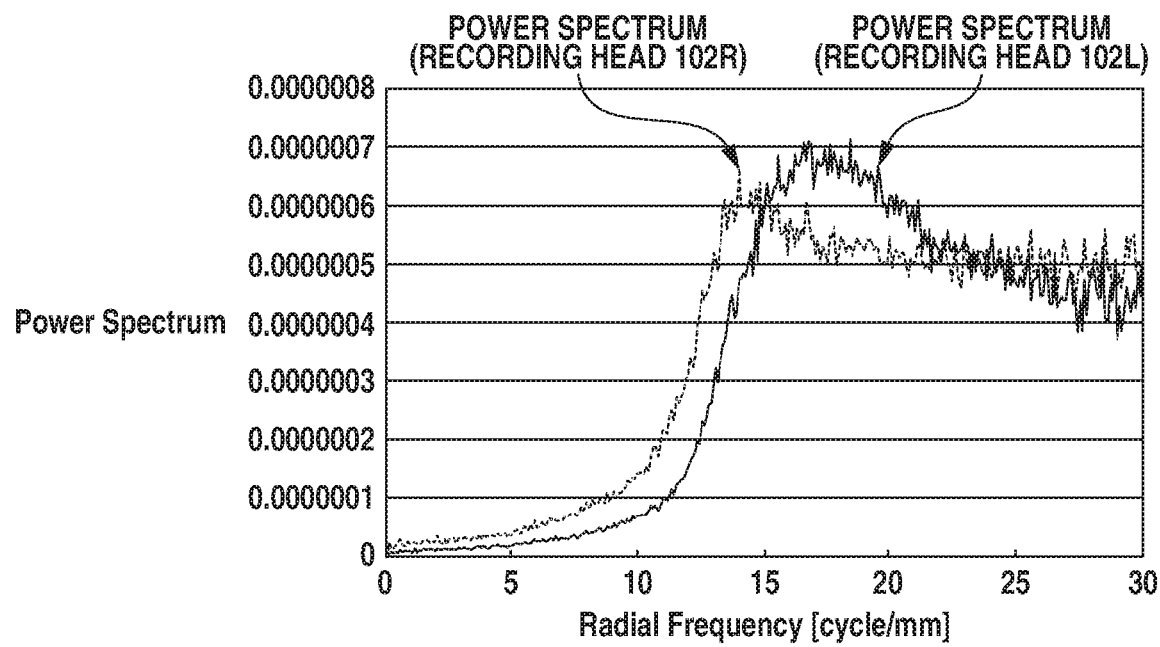
SPATIAL FREQUENCY CHARACTERISTICS OF
DOT ARRANGEMENTS IN AREA A2 RESPECTIVELY
FORMED BY RECORDING HEADS 102L AND 102R

DOT ARRANGEMENT
IN AREA A1

DOT ARRANGEMENT
IN AREA A2

DOT ARRANGEMENT IN AREA A2
(DISCHARGE FROM RECORDING
HEAD 102R DEVIATING ONE
PIXEL LEFTWARD)

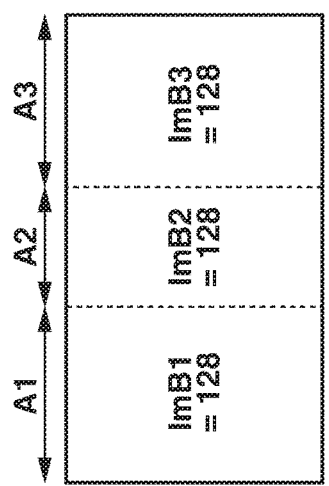
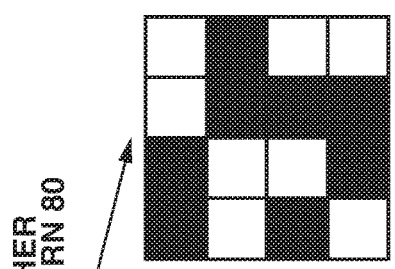
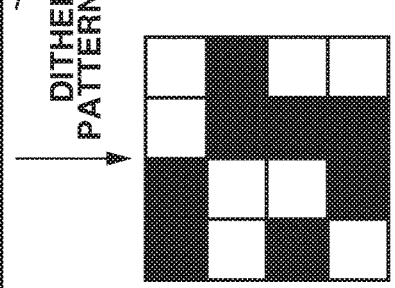
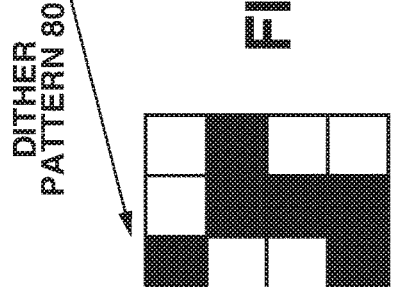
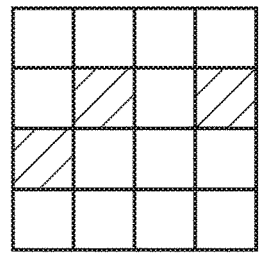
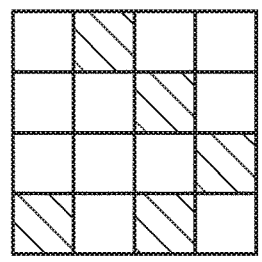

DOT ARRANGEMENT
IN AREA A1

DOT ARRANGEMENT
IN AREA A2

DOT ARRANGEMENT IN AREA A2
(DISCHARGE FROM RECORDING
HEAD 102R DEVIATING ONE
PIXEL LEFTWARD)

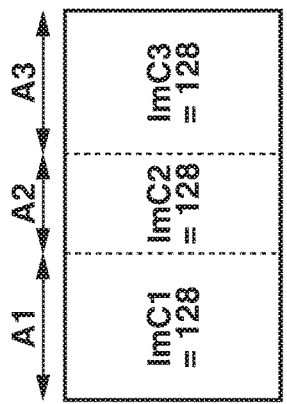
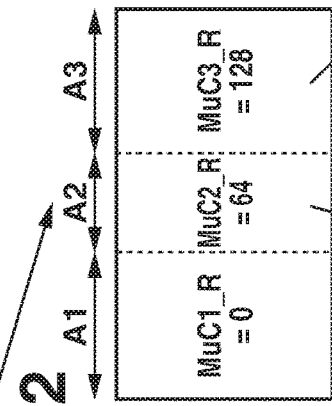
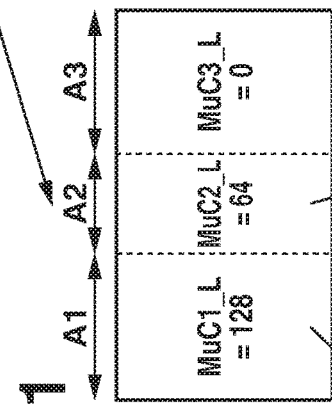
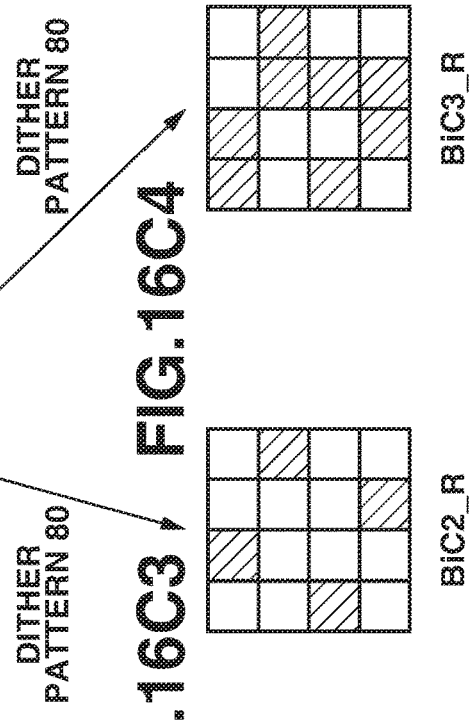
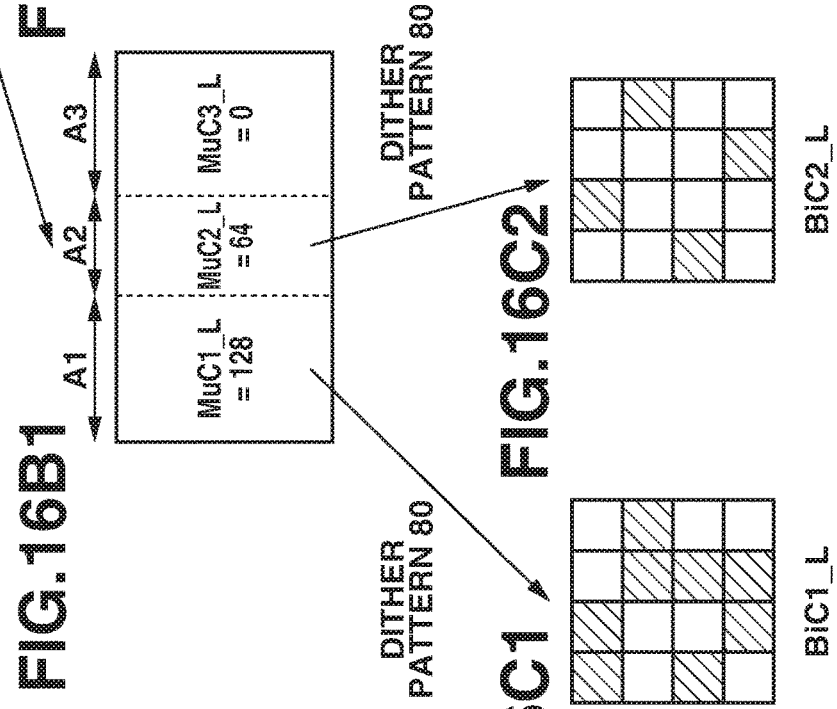
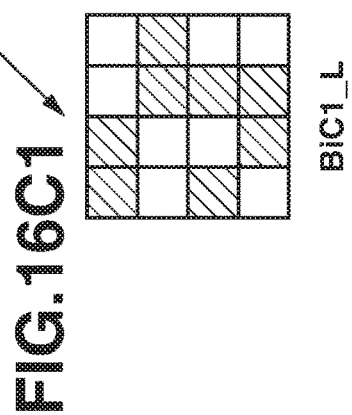

DOT ARRANGEMENT
IN AREA A1

DOT ARRANGEMENT
IN AREA A2

DOT ARRANGEMENT IN AREA A2
(DISCHARGE FROM RECORDING
HEAD 102R DEVIATING ONE
PIXEL LEFTWARD)

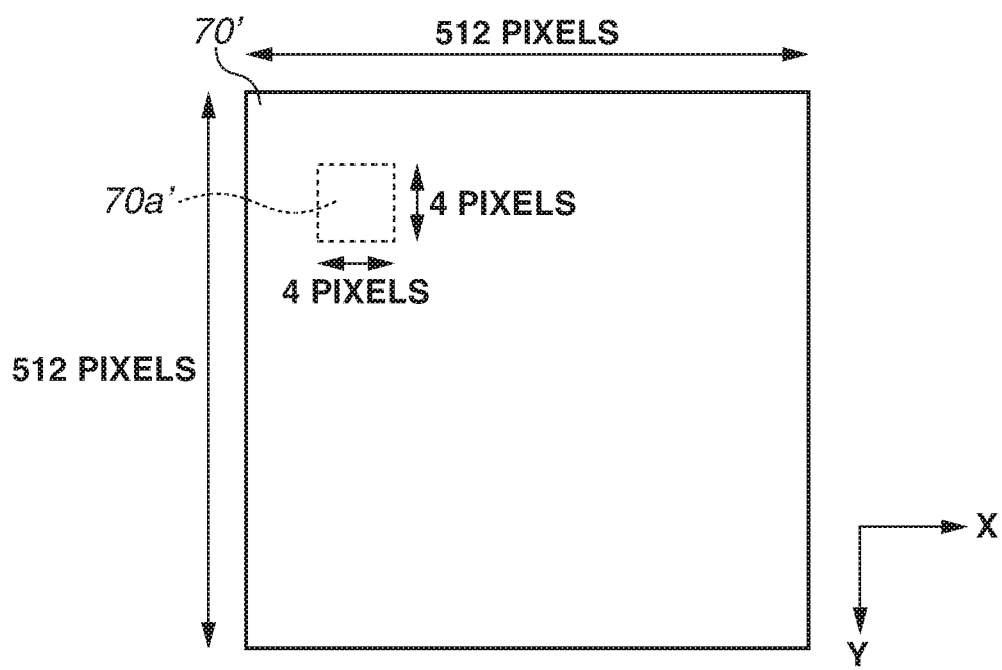

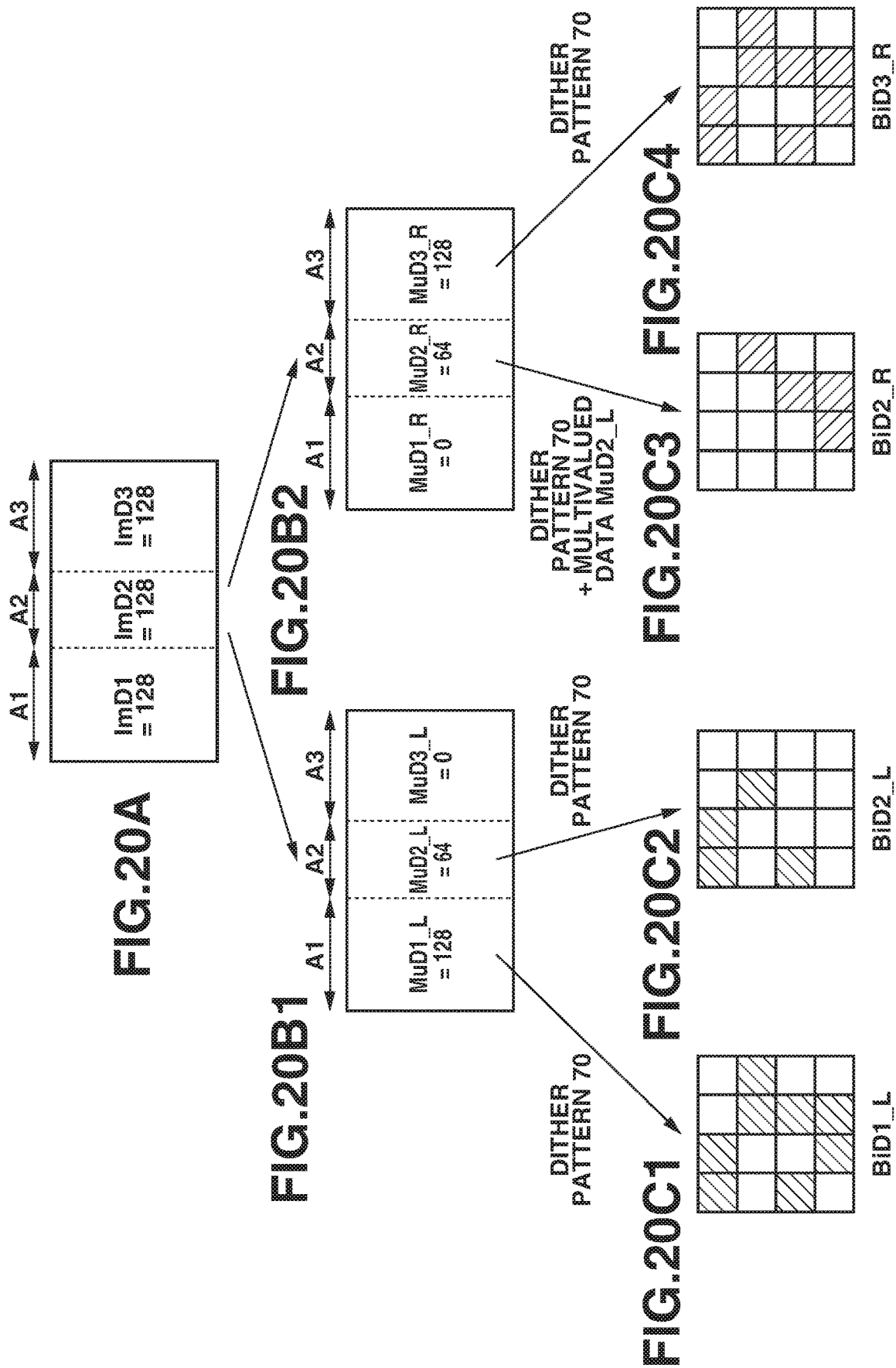

DOT ARRANGEMENT
IN AREA A1

DOT ARRANGEMENT
IN AREA A2

DOT ARRANGEMENT IN AREA A2
(DISCHARGE FROM RECORDING
HEAD 102R DEVIATING ONE
PIXEL LEFTWARD)

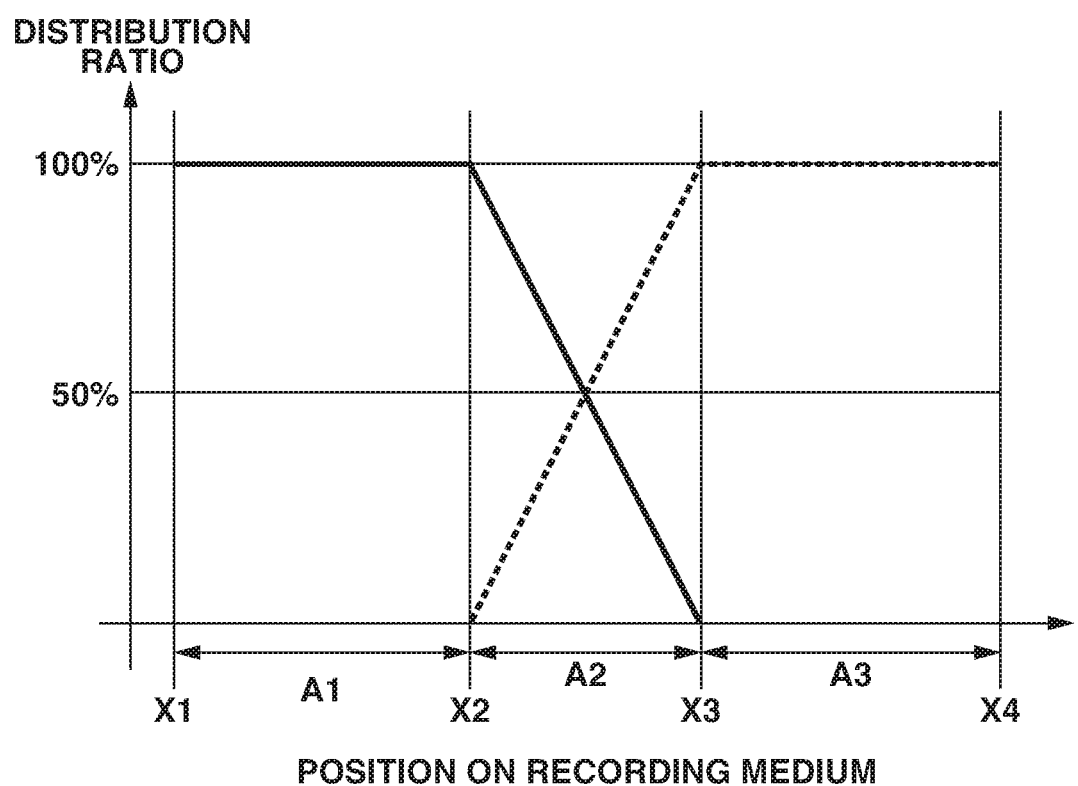

IMAGE PROCESSING APPARATUS AND METHOD SETTING DOT ARRANGEMENTS TO REDUCE DIFFERENCES IN DISPERSIVENESS OF DOTS BETWEEN OVERLAPPING AND NON-OVERLAPPING RECORDING AREAS

BACKGROUND OF THE INVENTION

Field of the Invention

Aspects of the embodiments generally relate to an image processing apparatus and an image processing method.

Description of the Related Art

Recording apparatuses are known which record an image by repeatedly performing record scanning for performing discharge of ink while relatively moving a recording unit, which has discharge port arrays in each of which a plurality of discharge ports for discharging ink is arrayed, with respect to a unit area of a recording medium.

In such recording apparatuses, a reduction in recording time for recording on a recording medium has heretofore been required. To attain such a reduction in recording time, U.S. Pat. No. 6,020,976 discusses using a recording unit which is provided with two recording sections, each having a plurality of discharge port arrays for discharging a plurality of colors of inks, respectively located at the left-hand side and right-hand side of the recording unit along a scan direction. In U.S. Pat. No. 6,020,976, the above-mentioned recording unit is used to form dots by discharging ink only from the left-hand recording section with respect to an area at the left-hand side along the scan direction of the recording medium and discharging ink only from the right-hand recording section with respect to an area at the right-hand side along the scan direction thereof. This enables completing recording without causing the recording unit to perform scanning over the entire area from a position facing the left-hand end portion of the recording medium to a position facing the right-hand end portion thereof, so that a recording time can be reduced.

When such a recording head as mentioned above is used, if a difference in discharge characteristics arises between two recording sections, a density difference may sometimes occur between an area subjected to recording by the left-hand recording section and an area subjected to recording by the right-hand recording section on the recording medium. Due to this density difference, in a case where recording is performed by only any of the left-hand recording section and the right-hand recording section with respect to the entire area along the scan direction on the recording medium, the image quality of an image obtained at a boundary between an area subjected to recording by the left-hand recording section and an area subjected to recording by the right-hand recording section may decrease. In view of this, U.S. Pat. No. 6,020,976 discusses preventing or reducing the above-mentioned decrease in image quality by performing recording on a middle portion along the scan direction on the recording medium using both the left-hand recording section and the right-hand recording section in a sharing (overlapping) manner.

To perform recording on the same area using two recording heads (sections) in a sharing manner, image data corresponding to an image that is to be recorded on an area subjected to overlapping recording by the left-hand and right-hand recording sections (hereinafter referred to as an "overlapping recording area") are distributed to the left-hand recording head (section) and the right-hand recording head (section). Here, U.S. Pat. No. 6,020,976 discusses distributing binary data obtained after quantization corresponding to an overlapping recording area using a distribution pattern in which recording allowable pixels are arranged at mutually exclusive and complementary positions. Using such a distribution pattern enables performing recording without causing a decrease in image quality between an image in the overlapping recording area and an image in an area other than the overlapping recording area (hereinafter referred to as a "non-overlapping recording area").

However, in the technique discussed in U.S. Pat. No. 6,020,976, if a discharge position deviation occurs between the left-hand recording section and the right-hand recording section, the frequency characteristics of the respective dot arrangements of the overlapping recording area and the non-overlapping recording area may become different from each other, thus causing a decrease in image quality.

In U.S. Pat. No. 6,020,976, two distribution patterns corresponding to two recording sections are determined in such a manner that, when a discharge position deviation does not occur, dots can be formed at mutually exclusive and complementary positions by the left-hand and right-hand recording sections. Accordingly, in a case where no discharge position deviation occurs between two recording sections, dot arrangements can be set to the mutually same arrangements between the overlapping recording area and the non-overlapping recording area.

However, in U.S. Pat. No. 6,020,976, a case where a discharge position deviation has occurred between two recording sections is not taken into consideration. Therefore, if a discharge position deviation occurs, the dot arrangement may deviate from the exclusive and complementary positions in the overlapping recording area, thus causing a decrease in image quality.

These respects are described in detail.

In general, it is desirable to perform setting such that, if a discharge position deviation does not occur, the dispersiveness of dots becomes high in each of the overlapping recording area and the non-overlapping recording area. However, even if such setting is performed, when a discharge position deviation occurs, the dot arrangement formed by the left-hand recording section and the dot arrangement formed by the right-hand recording section may deviate from each other with respect to the overlapping recording area. As a result, the superposition (logical sum) of the dot arrangements formed by the left-hand and right-hand recording sections in the overlapping recording area does not become an ideal position, so that the dispersiveness of dots in the overlapping recording area may become low.

On the other hand, in the non-overlapping recording area, since recording is performed by only one of the left-hand and right-hand recording sections, even if a discharge position deviation occurs between two recording sections, the dispersiveness of dots in the non-overlapping recording area remains unchanged. As a result, dots may be arranged with high dispersiveness in the non-overlapping recording area and with low dispersiveness in the overlapping recording area. This difference in dispersiveness between the areas may cause a decrease in image quality between the overlapping recording area and the non-overlapping recording area.

SUMMARY OF THE INVENTION

According to an aspect of the embodiments, an image processing apparatus that generates recording data with respect to a recording apparatus, the recording apparatus relatively moving a recording unit including a first recording section and a second recording section which are located away from each other along a predetermined direction with respect to a recording medium and, during relative movement of the recording unit, recording an image in a first area on the recording medium by applying a recording agent using the first recording section without using the second recording section and recording an image in a second area on the recording medium by applying the recording agent using the first recording section and the second recording section, includes an acquisition unit configured to acquire first multivalued image data including a plurality of pieces of data having gradation values respectively determined with respect to a plurality of pixels corresponding to an image to be recorded in the first area by the first recording section, second multivalued image data including a plurality of pieces of data having gradation values respectively determined with respect to a plurality of pixels corresponding to an image to be recorded in the second area by the first recording section, and third multivalued image data including a plurality of pieces of data having gradation values respectively determined with respect to a plurality of pixels corresponding to an image to be recorded in the second area by the second recording section, and a generation unit configured to generate first recording data to be used by the first recording section for image recording in the first area, second recording data to be used by the first recording section for image recording in the second area, and third recording data to be used by the second recording section for image recording in the second area by quantizing the first multivalued image data, the second multivalued image data, and the third multivalued image data.

Further features of the disclosure will become apparent from the following description of exemplary embodiments with reference to the attached drawings.

BRIEF DESCRIPTION OF THE DRAWINGS

FIG. 4 is a diagram illustrating a recording control system according to the exemplary embodiment.

FIG. 5 is a flowchart illustrating a process of image processing according to the exemplary embodiment.

FIGS. 6A, 6B, and 6C are diagrams illustrating quantization processing using a commonly-used dither pattern.

FIGS. 8A, 8B1, 8B2, 8C1, 8C2, 8C3, and 8C4 are diagrams illustrating distribution processing and quantization processing in the exemplary embodiment.

FIGS. 9A and 9B are diagrams illustrating subtraction processing in a dither pattern in the exemplary embodiment.

FIGS. 10A, 10B, and 10C are diagrams illustrating dot arrangements and spatial frequency characteristics thereof in the exemplary embodiment.

FIGS. 14A, 14B1, 14B2, 14B3, 14C1, and 14C2 are diagrams illustrating distribution processing and quantization processing in the comparative embodiment.

FIGS. 16A, 16B1, 16B2, 16C1, 16C2, 16C3, and 16C4 are diagrams illustrating dot arrangements in a comparative embodiment.

FIGS. 19A and 19B are diagrams illustrating subtraction processing in a dither pattern in the comparative embodiment.

FIGS. 20A, 20B1, 20B2, 20C1, 20C2, 20C3, and 20C4 are diagrams illustrating dot arrangements in the comparative embodiment.

FIG. 22 is a diagram illustrating distribution processing in an exemplary embodiment.

DESCRIPTION OF THE EMBODIMENTS

Hereinafter, a first exemplary embodiment of the disclosure is described in detail with reference to the drawings.

Figure 1:
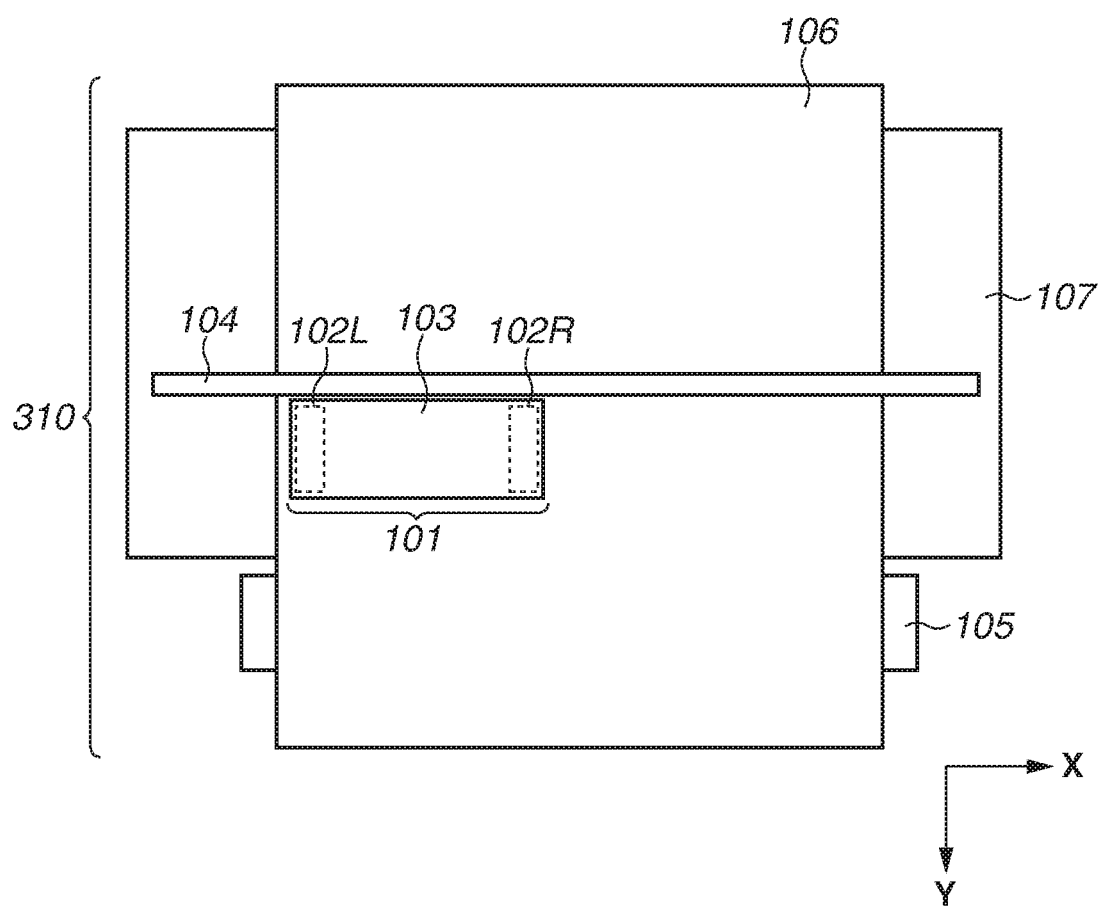
FIG. 1 is a schematic diagram illustrating an internal configuration of a recording apparatus according to an exemplary embodiment.

FIG. 1 is a schematic diagram illustrating an internal configuration of an inkjet recording apparatus 310 according to the present exemplary embodiment.

The inkjet recording apparatus (hereinafter also referred to as a "printer" or a "recording apparatus") 310 according to the present exemplary embodiment includes a recording unit 101. The recording unit 101 includes a recording head 102L and a recording head 102R, and the recording head 102L and the recording head 102R are held by a single holding portion 103. Each of the recording heads 102L and 102R is provided with discharge port arrays for respectively discharging black ink, cyan ink, magenta ink, and yellow ink, the details of which are described below.

The recording unit 101 is configured to be able to relatively reciprocate (perform scanning) along an X-direction (predetermined direction or scanning direction) in line with a guide rail 104, which is provided to extend along the X-direction, with respect to a recording medium 106. Furthermore, the recording medium 106 is supported by a platen 107, and is conveyed in a Y-direction (conveyance direction) by a conveyance roller 105 being rotated. The inkjet recording apparatus 310 in the present exemplary embodiment completes recording on the entire area of the recording medium 106 by repeatedly performing a recording operation, which is accompanied by the above-mentioned recording unit 101 performing scanning along the X-direction, and a conveyance operation, in which the conveyance roller 105 conveys the recording medium 106 in the Y-direction.

Figure 2A:
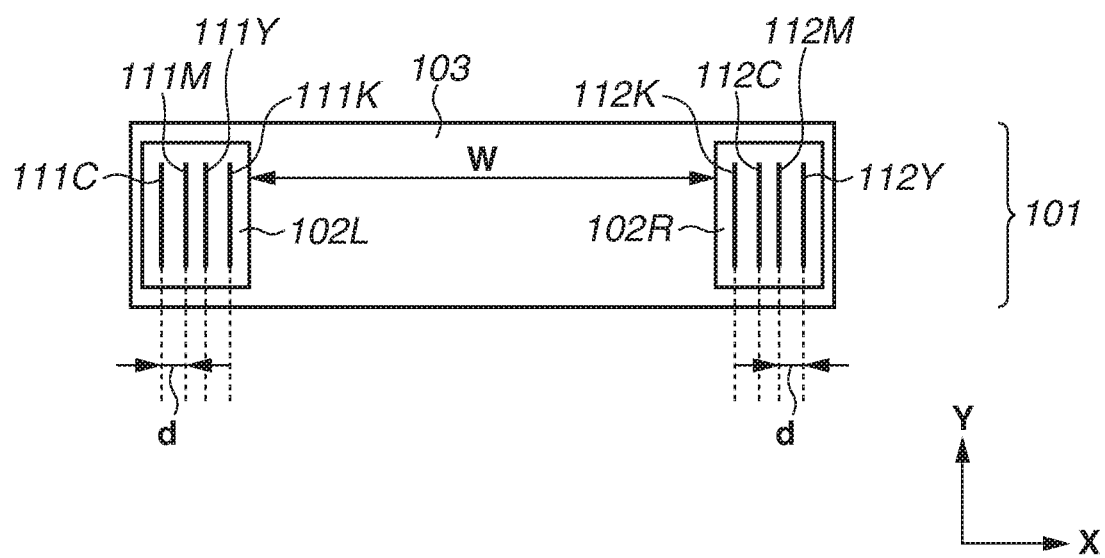
FIGS. 2A and 2B are diagrams each illustrating a recording unit according to the exemplary embodiment.
Figure 2B:
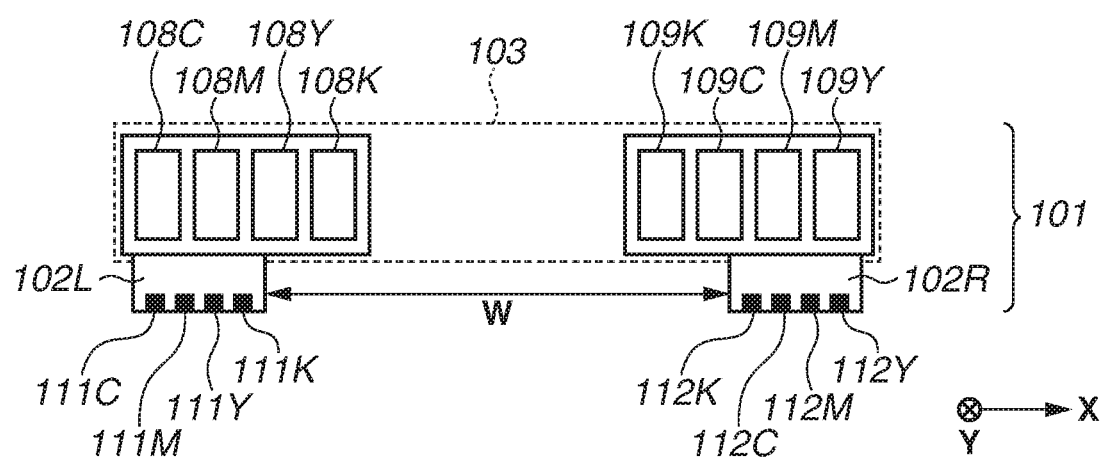

FIGS. 2A and 2B are diagrams illustrating the details of the recording unit 101 employed in the present exemplary embodiment. Furthermore, FIG. 2A is a diagram schematically illustrating the recording unit 101 as viewed from below vertically relative to the XY-plane. Moreover, FIG.

2B is a diagram schematically illustrating the recording unit 101 as viewed from the Y-direction.

In the recording unit 101 in the present exemplary embodiment, the recording head 102L and the recording head 102R are provided away from each other by a distance W along the X-direction. Then, the recording head 102L includes four discharge port arrays 111C, 111M, 111Y, and 111K, which are arranged in the order of the discharge port array 111C, which discharges cyan ink, the discharge port array 111M, which discharges magenta ink, the discharge port array 111Y, which discharges yellow ink, and the discharge port array 111K, which discharges black ink as viewed from the left-hand side along the X-direction. On the other hand, the recording head 102R includes four discharge port arrays 112C, 112M, 112Y, and 112K, which are arranged in the order of the discharge port array 112K, which discharges black ink, the discharge port array 112C, which discharges cyan ink, the discharge port array 112M, which discharges magenta ink, and the discharge port array 112Y, which discharges yellow ink as viewed from the left-hand side along the X-direction. Furthermore, each discharge port in the recording heads 102L and 102R is manufactured in such a way as to discharge ink with a discharge amount of 3 nanograms (ng).

Here, four discharge port arrays 111C, 111M, 111Y, and 111K in the recording head 102L are arranged away from each other by the same distance d. Similarly, four discharge port arrays 112C, 112M, 112Y, and 112K in the recording head 102R are arranged away from each other by the same distance d. Moreover, each of the eight discharge port arrays includes a plurality of discharge ports (not illustrated) for discharging each color ink arrayed along the Y-direction (array direction).

Furthermore, the arrangement sequence of discharge port arrays in each of the recording heads 102L and 102R in the X-direction can be another sequence.

Moreover, as can be seen from FIGS. 2A and 2B, the recording heads 102L and 102R are provided at the same position with respect to the Y-direction but are provided at positions away from each other with respect to the X-direction. Furthermore, while, here, the recording unit 101 includes the recording heads 102L and 102R provided at the same position with respect to the Y-direction, the recording heads 102L and 102R can be provided at positions shifting in the Y-direction as long as being configured such that recording areas corresponding to the discharge port arrays for discharging respective color inks partially overlap each other with respect to the Y-direction in such a way as to be able to perform recording on at least a part of the recording medium with both of the recording heads 102L and 102R in the same scan.

Discharge ports included in each discharge port array in the recording head 102L are connected to an ink tank, which stores each color ink, via a flow path (not illustrated). More specifically, discharge ports arrayed in the discharge port array 111C are connected to an ink tank 108C, which stores cyan ink, discharge ports arrayed in the discharge port array 111M are connected to an ink tank 108M, which stores magenta ink, discharge ports arrayed in the discharge port array 111Y are connected to an ink tank 108Y, which stores yellow ink, and discharge ports arrayed in the discharge port array 111K are connected to an ink tank 108K, which stores black ink. Similarly, in the recording head 102R, discharge ports arrayed in the discharge port array 112C are connected to an ink tank 109C, which stores cyan ink, discharge ports arrayed in the discharge port array 112M are connected to an ink tank 109M, which stores magenta ink, discharge ports arrayed in the discharge port array 112Y are connected to an ink tank 109Y, which stores yellow ink, and discharge ports arrayed in the discharge port array 112K are connected to an ink tank 109K, which stores black ink.

Furthermore, while, here, a configuration in which a discharge port array in the recording head 102L and a discharge port array in the recording head 102R which discharge the same color ink are connected to respective different ink tanks has been described, a configuration in which those are connected to one and the same ink tank can be employed. Moreover, regardless of a case where different ink tanks are used or a case where one and the same ink tank is used, each ink tank is provided close to the middle portion in the X-direction of the holding portion 103, so that the recording unit 101 can be reduced in size. However, if such a reduction in size is not considered, for example, in a case where two different ink tanks are used, each recording head and the middle portion in the X-direction of each ink tank can be designed to approximately match each other in position.

Figure 3:
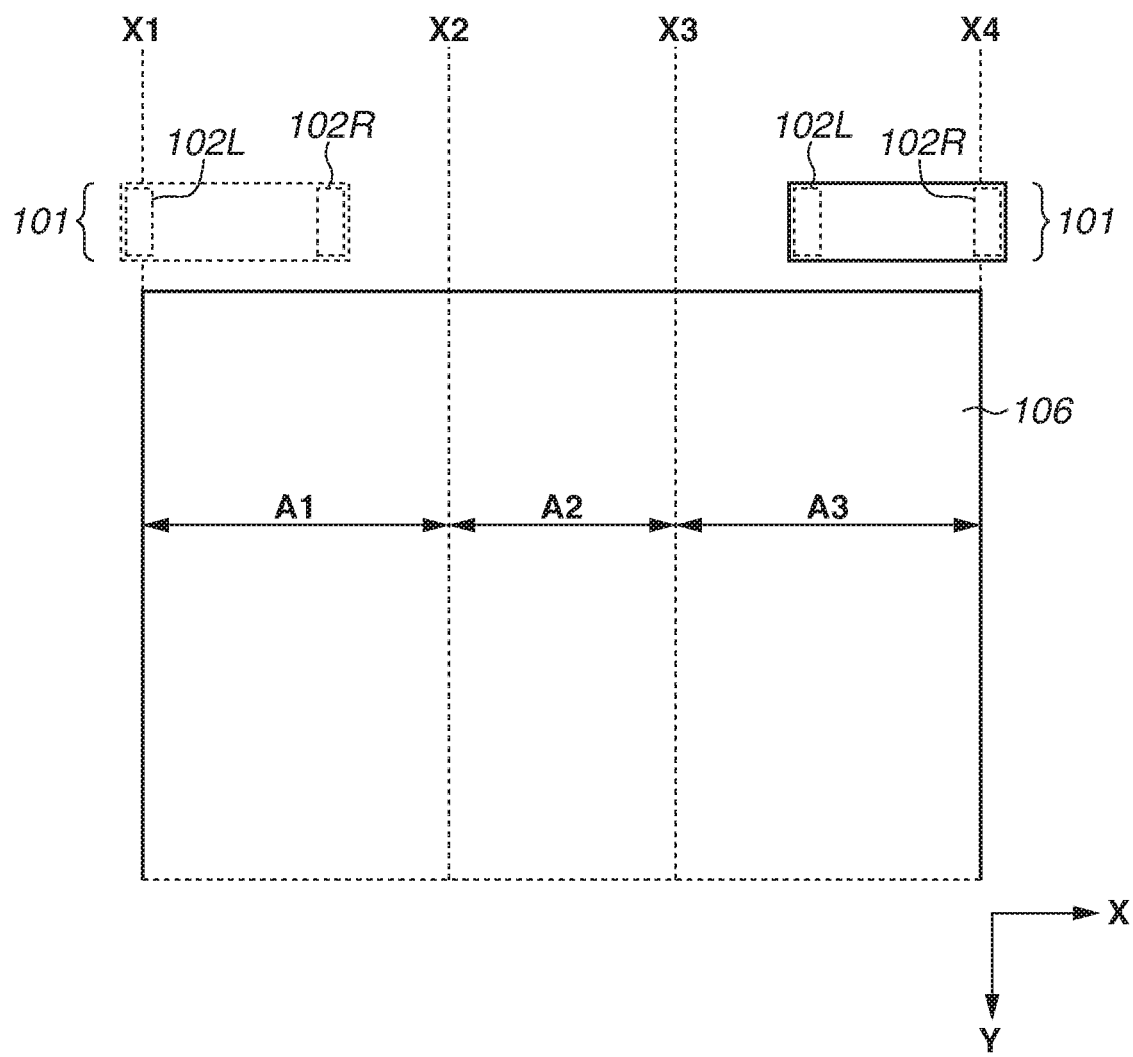
FIG. 3 is a diagram illustrating a recording method in the exemplary embodiment.

FIG. 3 is a schematic diagram illustrating a behavior in which recording is performed on the recording medium 106 by using the recording unit 101. Furthermore, out of two recording units 101 illustrated in FIG. 3, a recording unit 101 drawn by a dashed line and situated at the left-hand side with respect to the X-direction indicates the position of the recording unit 101 taken at timing of starting recording on the recording medium 106 in a case where scanning is performed from the left-hand side to the right-hand side in the X-direction. Moreover, a recording unit 101 drawn by a solid line and situated at the right-hand side with respect to the X-direction indicates the position of the recording unit 101 taken at timing of ending recording on the recording medium 106 in a case where scanning is performed from the left-hand side to the right-hand side in the X-direction.

In the following description, the left-hand end position in the X-direction of the recording medium 106 is referred to as a "position X1", and the right-hand end position in the X-direction of the recording medium 106 is referred to as a "position X4". Moreover, a predetermined position on the right side of the position X1 in the X-direction is referred to as a "position X2", and a predetermined position on the left side of the position X4 in the X-direction is referred to as a "position X3". When the positions X1 to X4 are defined in the above-mentioned way, an area on the left side in the X-direction from the position X1 to the position X2 on the recording medium 106 is referred to as an "area A1", an area at the middle in the X-direction from the position X2 to the position X3 on the recording medium 106 is referred to as an "area A2", and an area on the right side in the X-direction from the position X3 to the position X4 on the recording medium 106 is referred to as an "area A3".

The area A1 is an area in which ink is not discharged from the recording head 102R and recording is performed with only discharge of ink from the recording head 102L. Moreover, the area A3 is an area in which ink is not discharged from the recording head 102L and recording is performed with only discharge of ink from the recording head 102R.

On the other hand, the area A2 is an area in which recording is performed in an overlapping manner with discharge of ink from both of the recording heads 102L and 102R (an overlapping recording area). Accordingly, in the present exemplary embodiment, data corresponding to the area A2 is divided by performing recording head distribution processing, which is described below, so that recording data used to perform overlapping recording on the area A2 using both the recording head 102L and the recording head 102R is generated.

As mentioned above, in the present exemplary embodiment, the recording medium 106 is divided into three areas in the X-direction, and recording is performed with different recording heads used to discharge ink for respective three areas, i.e., the area A1, the area A2, which is adjacent to the area A1 in the X-direction, and the area A3, which is adjacent to the area A2 in the X-direction. More specifically, ink is discharged by only the recording head 102L to perform recording in the area A1 on the left side in the X-direction, ink is discharged by only the recording head 102R to perform recording in the area A3 on the right side in the X-direction, and ink is discharged by both of the recording heads 102L and 102R to perform recording in the area A2 at the middle in the X-direction.

FIG. 4 is a block diagram illustrating a schematic configuration of a recording control system in the present exemplary embodiment. The recording control system in the present exemplary embodiment includes a printer 310 illustrated in FIG. 1 and a personal computer (PC) 300 serving as a host device for the printer 310.

The PC 300 is configured to include the following elements. A central processing unit (CPU) 301, which is an image processing unit, performs processing according to a program retained in a random access memory (RAM) 302 or a hard disk drive (HDD) 303 to generate RGB data represented by red (R), green (G), and blue (B) components corresponding to a recording image. The RAM 302, which is a volatile memory, temporarily retains programs and data. The HDD 303, which is a non-volatile memory, also retains programs and data. In the present exemplary embodiment, a data transfer interface (I/F) 304 controls transmitting and receiving of RGB data between the CPU 301 and the printer 310. The connection method for this data transmission and reception to be used includes, for example, a universal serial bus (USB), an IEEE 1394 bus, and a local area network (LAN). A keyboard and mouse I/F 305 is an I/F used to control human interface devices (HIDs), such as a keyboard and mouse, and the user is allowed to perform inputting via the keyboard and mouse I/F 305. A display I/F 306 controls displaying performed by a display (not illustrated).

On the other hand, the printer 310 is configured to include the following elements. A CPU 311, which is an image processing unit, performs various processing operations, which are described below, according to a program retained in a RAM 312 or a read-only memory (ROM) 313. The RAM 312, which is a volatile memory, temporarily retains programs and data. The ROM 313, which is a non-volatile memory, is able to retain table data and programs which are used in various processing operations. Furthermore, distribution patterns which are used in left-and-right recording head distribution processing, which is described below, are also retained in the ROM 313. A data transfer I/F 314 controls transmitting and receiving of data between the CPU 311 and the PC 300.

A left head controller 315L and a right head controller 315R respectively supply recording data to the recording head 102L and the recording head 102R illustrated in FIG. 3 and control (perform recording control on) respective recording operations of the recording heads 102L and 102R. More specifically, the left head controller 315L is configured to read control parameters and recording data from a predetermined address of the RAM 312. Then, when the CPU 311 writes control parameters and recording data into the predetermined address of the RAM 312, processing is started by the left head controller 315L, so that ink discharge from the recording head 102L is performed. It is the same with the right head controller 315R, and, when the CPU 311 writes control parameters and recording data into a predetermined address of the RAM 312, processing is started by the right head controller 315R, so that ink discharge from the recording head 102R is performed.

Furthermore, while, here, a configuration in which only one CPU 311 is included in the printer 310 is described, a plurality of CPUs can be included.

FIG. 5 is a flowchart of recording data generation processing used for recording, which the CPU 311 performs according to a control program in the present exemplary embodiment. Furthermore, the control program is previously stored in the ROM 313.

When RGB data represented in the RGB format is input (acquired) from the PC 300 to the recording apparatus 310, first, in step S801, the CPU 311 performs color conversion processing for converting the RGB data into ink color data corresponding to each color of ink used for recording. This color conversion processing is used to generate ink color data represented by 8-bit 256-valued information which defines a gradation value in each of a plurality of pixels. As mentioned above, in the present exemplary embodiment, since black ink, cyan ink, magenta ink, and yellow ink are used for recording, as an example of color conversion processing in which pieces of ink color data respectively corresponding to black ink, cyan ink, magenta ink, and yellow ink are generated by the color conversion processing in step S801, a three-dimensional look-up table (3D-LUT) which defines a correspondence relationship between RGB values and CMYK values previously stored in the ROM 313 can be used.

Next, in step S802, the CPU 311 performs gradation correction processing for correcting gradation values indicated by respective pieces of ink color data corresponding to the CMYK values to generate gradation correction data (image data) represented by 8-bit 256-valued information corresponding to each of the CMYK values. In this gradation correction processing, for example, a one-dimensional look-up table (1D-LUT) which defines a correspondence relationship between pieces of ink color data corresponding to respective inks of colors obtained before correction and pieces of gradation correction data corresponding to respective inks of colors obtained after correction can be used. Furthermore, the 1D-LUT is previously stored in the ROM 313.

Next, in step S803, the CPU 311 performs distribution processing for distributing the gradation correction data to the recording head 102L and the recording head 102R to generate distribution data (multivalued data or multivalued image data).

With regard to respective areas, since recording in the area A1 is performed by only the recording head 102L, gradation correction data corresponding to the area A1 is distributed to only the recording head 102L. Moreover, since recording in the area A3 is performed by only the recording head 102R, gradation correction data corresponding to the area A3 is distributed to only the recording head 102R.

On the other hand, since recording in the area A2 is performed by both of the recording heads 102L and 102R, gradation correction data corresponding to the area A2 is distributed to both the recording head 102L and the recording head 102R. Here, in the present exemplary embodiment, distribution of the gradation correction data corresponding to the area A2 is performed in such a manner that the value indicated by distribution data corresponding to the recording head 102L and the value indicated by distribution data corresponding to the recording head 102R, which are obtained after distribution, become the same. For example, in a case where the value indicated by distribution data in a given area is "128", distribution processing is performed in such a manner that, in the given area, the value indicated by distribution data corresponding to the recording head 102L becomes "64" and the value indicated by distribution data corresponding to the recording head 102R also becomes "64".

Next, in each of steps S804L and S804R, the CPU 311 performs quantization processing for quantizing the distribution data to generate recording data (binary data) used for recording represented by 1-bit binary information which defines discharge or non-discharge of ink of each color with respect to each pixel. The quantization processing is described below.

Furthermore, while, here, a configuration in which all of the processing operations in steps S801 to S804L and S804R are performed by the CPU 311 included in the printer 310 is described, the CPU 301 included in the PC 300 can perform a part or all of the processing operations in steps S801 to S804L and S804R.

<Quantization Processing Using a Commonly-used Dither Pattern>

FIG. 6A is a diagram illustrating an example of a commonly-used dither pattern. Moreover, FIG. 6B is a diagram illustrating binary data which is obtained by applying the dither pattern illustrated in FIG. 6A when multivalued data indicating a value of "64" is input to each pixel. Moreover, FIG. 6C is a diagram illustrating binary data which is obtained by applying the dither pattern illustrated in FIG. 6A when multivalued data indicating a value of "128" is input to each pixel. Furthermore, here, for ease of description, a case where a dither pattern with a size of 4 pixels by 4 pixels is used is described. Furthermore, this area with a size of 4 pixels by 4 pixels is also referred to as a "pixel area".

In the dither pattern, as illustrated in FIG. 6A, different threshold values are determined with respect to respective pixels. The range in which threshold values can be defined corresponds to the range of values which can be indicated by the input multivalued data, and, if the multivalued data is, for example, 8-bit 256-valued information, any one of threshold values of 1 to 256 is determined for each pixel.

Here, in a case where, in a given pixel, the value indicated by multivalued data is equal to or greater than a threshold value, the multivalued data is converted into binary data indicating discharge of ink with respect to the given pixel. On the other hand, in a case where, in the given pixel, the value indicated by multivalued data is less than the threshold value, the multivalued data is converted into binary data indicating non-discharge of ink with respect to the given pixel.

For example, in a case where multivalued data indicating a value of "64" is input to each pixel, as illustrated in FIG. 6B, binary data in which discharge of ink is determined with respect to pixels (threshold pixels) with threshold values equal to or less than "64" determined among the pixels included in the dither pattern illustrated in FIG. 6A and non-discharge of ink is determined with respect to the other pixels is generated. Moreover, in a case where multivalued data indicating a value of "128" is input to each pixel, as illustrated in FIG. 6C, binary data in which discharge of ink is determined with respect to pixels with threshold values equal to or less than "128" determined among the pixels included in the dither pattern illustrated in FIG. 6A and non-discharge of ink is determined with respect to the other pixels is generated.

<Quantization Processing in the Present Exemplary Embodiment>

In the following description, quantization processing which is performed in the present exemplary embodiment is described in detail.

Figure 7A:
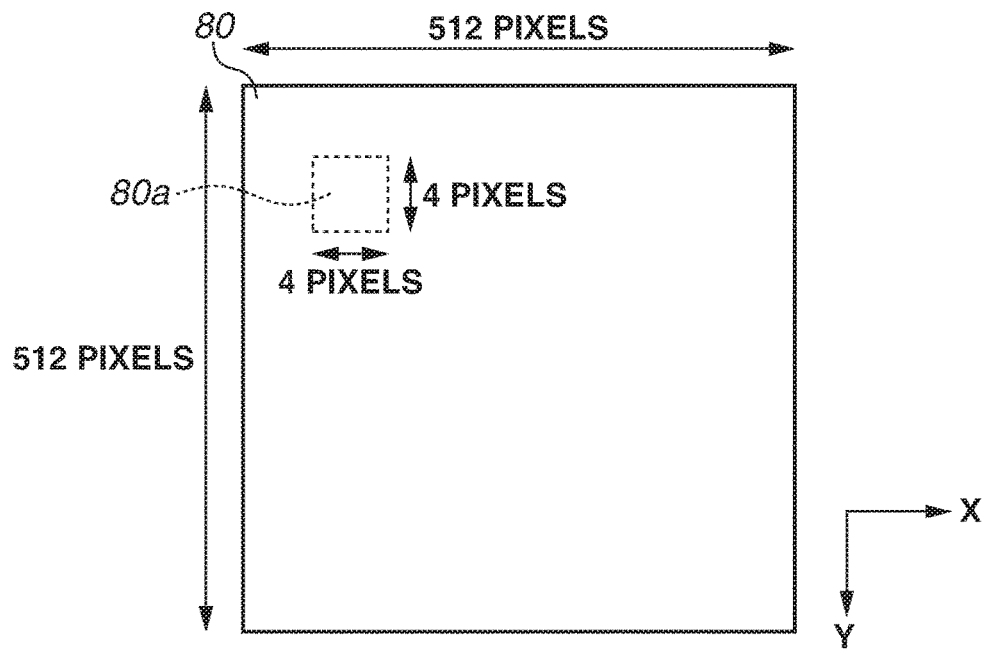
FIGS. 7A, 7B, 7C, and 7D are diagrams illustrating a dither pattern in the exemplary embodiment.

FIGS. 7A, 7B, 7C, and 7D are diagrams illustrating a dither pattern 80 which is used in the present exemplary embodiment. The dither pattern 80 illustrated in the present exemplary embodiment has a size of 512 pixels by 512 pixels as illustrated in FIG. 7A. Furthermore, although not illustrated in FIG. 7A for ease of description, actually, threshold values of 1 to 256 are determined with respect to respective pixels in the 512 pixels by 512 pixels.

Here, in the following description, when threshold values of 1 to 256 are divided into four groups of threshold values 1 to 64, 65 to 128, 129 to 192, and 193 to 256, the threshold values of 1 to 64, which correspond to the smallest group of threshold values, are referred to as "the smallest threshold values". Moreover, out of the above-mentioned four groups, the threshold values of 65 to 128, which correspond to a group of threshold values smallest next to "the smallest threshold values", are referred to as "the second smallest threshold values".

Figure 7B:
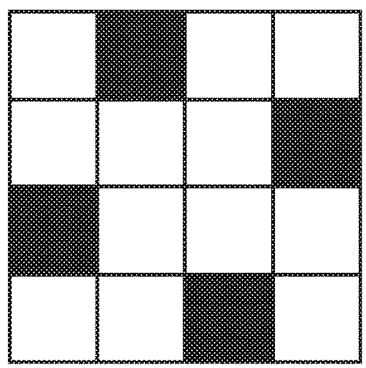

FIG. 7B is a diagram illustrating a partial area 80a with a size of 4 pixels by 4 pixels extracted from the dither pattern 80 with a size of 512 pixels by 512 pixels illustrated in FIG. 7A.

Unlike the dither pattern illustrated in FIG. 6A, the dither pattern 80 which is used in the present exemplary embodiment illustrated in FIG. 7A has threshold values determined with respect to respective pixels in such a manner that the dispersiveness of pixels with the smallest threshold values determined is larger than the dispersiveness of pixels with the second smallest threshold values determined. The pixels with the smallest threshold values determined are pixels which determine discharge of ink even when relatively small multivalued data, such as 65, 66, or 67, is input. In other words, the pixels with the smallest threshold values determined in the dither pattern are pixels which are likely to determine (which frequently determine) discharge of ink. Therefore, in the present exemplary embodiment, the dispersiveness of pixels with the smallest threshold values determined is set larger than that of pixels with the other threshold values determined.

To evaluate the dispersiveness of pixels in a given area, using spatial frequency characteristics corresponding to the arrangement of pixels in the given area is generally known. The spatial frequency characteristics are generally used as an index for evaluating the dispersiveness of pixels. According to a method described in, for example, T. Mitsa and K. J. Parker, "Digital Halftoning using a Blue Noise Mask", Proc. SPIE, Vol. 1452, pp. 47-56 (1991), the arrangement of pixels can be converted from a spatial region to a frequency region, so that spatial frequency characteristics corresponding to the arrangement of pixels can be obtained. The spatial frequency characteristics which are obtained by the above-mentioned method are represented by two dimensions with frequencies on the horizontal axis and output values (power spectra) corresponding to respective frequencies on the vertical axis.

Generally, in a case where the dispersiveness of pixels is low, the spatial frequency characteristics have large power spectra in relatively low frequencies (a low-frequency region), and, in a case where the dispersiveness of pixels is high, the spatial frequency characteristics have large power spectra in relatively high frequencies (a high-frequency region). Here, in the present exemplary embodiment, with regard to low-frequency components, in a range of frequency regions in which power spectra are present, a half of the range close to low frequencies is referred to as a low-frequency region, a remaining half of the range close to high frequencies is referred to as a high-frequency region, and power spectra present in the above-mentioned low-frequency region are referred to as low-frequency components. With regard to specific numerical values, in a dither pattern with a size of 512 pixels by 512 pixels, it is desirable that power spectra present in a range smaller than 15 cycles/mm be set as low-frequency components. Moreover, it is desirable that comparison of frequency components be performed by using integrated values of power spectra present in the low-frequency region.

To set the dither pattern 80 in the present exemplary embodiment as described above, threshold values are to be determined with respect to respective pixels in such a manner that frequency components in spatial frequency characteristics corresponding to the arrangement (threshold pixel arrangement) of pixels with the smallest threshold values determined are smaller than frequency components in spatial frequency characteristics corresponding to the arrangement (threshold pixel arrangement) of pixels with the second smallest threshold values determined.

Furthermore, "dispersiveness" corresponds to "evenness of a sparse or dense state". Here, in a case where two pixels are located at positions close to each other, the two pixels are "dense", and, on the other hand, in a case where two pixels are located at positions away from each other, the two pixels are "sparse". For example, in a case where, in a given space, predetermined pixels are two-dimensionally arranged at constant intervals, in other words, the sparse or dense state of predetermined pixels is almost even in the space, the state corresponds to the predetermined pixels being "high in dispersiveness". On the other hand, in a case where, in a given area in a given space, predetermined pixels are large in number and are located at positions close to each other and, in another area, predetermined pixels are small in number and are located at positions away from each other, in other words, the sparse or dense state of predetermined pixels varies according to areas in the given space (the sparse or dense state is uneven), the state corresponds to the predetermined pixels being "low in dispersiveness".

Figure 7C:
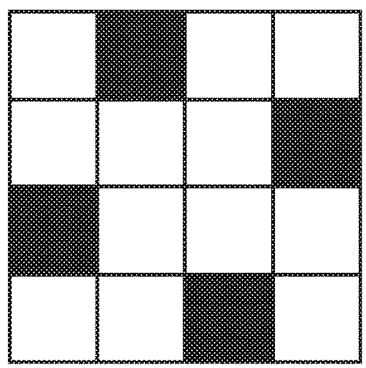

FIG. 7C is a diagram illustrating four pixels with the smallest threshold values (here, 16, 32, 48, and 64) determined, which are drawn as blocks filled in black, out of areas included in the dither pattern illustrated in FIG. 7B. Moreover, FIG. 7D is a diagram illustrating four pixels with the second smallest threshold values (here, 80, 96, 112, and 128) determined, which are drawn as blocks filled in black, out of areas included in the dither pattern illustrated in FIG. 7B.

Figure 7D:
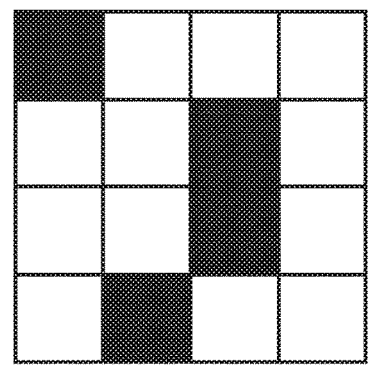

As can be seen from comparison between FIG. 7C and FIG. 7D, the pixels with the smallest threshold values determined illustrated in FIG. 7C are higher in dispersiveness than the pixels with the second smallest threshold values determined illustrated in FIG. 7D.

Moreover, with regard to the sparse or dense state, while four pixels with the smallest threshold values determined illustrated in FIG. 7C are located at positions away from each other by approximately the same distance, part of four pixels with the second smallest threshold values determined illustrated in FIG. 7D are located at positions adjacent to each other and the other part of four pixels are located at positions away from the other pixels. In this way, four pixels with the second smallest threshold values determined illustrated in FIG. 7D are uneven in the sparse or dense state. In view of this, it can be seen that the pixels with the smallest threshold values determined illustrated in FIG. 7C are almost even in the sparse or dense state and the pixels with the second smallest threshold values determined illustrated in FIG. 7D are uneven in the sparse or dense state.

Furthermore, while, here, the area 80a illustrated in FIG. 7B, which is extracted from the dither pattern 80, is described in detail, respective threshold values are determined with respect to the entire area of the dither pattern 80 illustrated in FIG. 7A. More specifically, with regard to "low-frequency components", respective threshold values are determined with respect to the entire area of the dither pattern 80 in such a manner that frequency components in spatial frequency characteristics corresponding to the arrangement (threshold pixel arrangement) of pixels with the smallest threshold values determined have smaller frequency characteristics than those of frequency components in spatial frequency characteristics corresponding to the arrangement (threshold pixel arrangement) of pixels with the second smallest threshold values determined. Moreover, with regard to "dispersiveness", respective threshold values are determined with respect to the entire area of the dither pattern 80 in such a manner that the dispersiveness of pixels with the smallest threshold values determined is higher than the dispersiveness of pixels with the second smallest threshold values determined. Moreover, with regard to "sparse or dense state", respective threshold values are determined with respect to the entire area of the dither pattern 80 in such a manner that the pixels with the smallest threshold values determined are almost even in the sparse or dense state and the pixels with the second smallest threshold values determined are uneven in the sparse or dense state.

The method for generating the above-mentioned dither pattern 80 illustrated in FIG. 7A includes a void-and-cluster method described in, for example, Robert A. Ulichney, "The void-and-cluster method for dither array generation", Proceedings SPIE, Human Vision, Visual Processing, and Digital Display IV, vol. 1913, pp. 332-343 (1993). In the void-and-cluster method, first, dots are arranged in an area with a given gradation, and the dot density in each position in the area in which the dots are arranged is determined. Here, to evaluate the dot density, the intensity sum of a Gaussian filter is used. Then, a position in which the dot density obtained from the above-mentioned intensity sum is high is searched for, and threshold values closer to the low-gradation side than the given gradation are determined in such a manner that dots are decreased at the found position. On the other hand, with regard to the high-gradation side relative to the given gradation, a position in which the dot density in the given gradation is low is searched for, and threshold values are determined in such a manner that dots are increased at the found position. These processing operations are sequentially performed with respect to each of the low-gradation side and the high-gradation side relative to the given gradation, thus determining the arrangement of threshold values.

Moreover, after satisfying a rule of arranging any four of threshold values of 1 to 64 in each area with 4 pixels by 4 pixels and arranging any four of threshold values of 65 to 128 therein, a dither pattern can be set by sequentially arranging respective threshold values in ascending order in such a manner that, in the entire area with 512 pixels by 512 pixels, the arrangement (threshold pixel arrangement) of pixels with threshold values of 1 to determined is smaller in low frequency components in spatial frequency characteristics and smaller in dispersiveness than the arrangement (threshold pixel arrangement) of pixels with threshold values of 65 to 128 determined and is almost even in the sparse or dense state.

Furthermore, a dither pattern can be set by sequentially arranging respective threshold values in ascending order with respect to the entire area with 512 pixels by 512 pixels. First, a pixel with a threshold value "1" determined is located at one pixel in the 512 pixels by 512 pixels. Next, another pixel with a threshold value "1" determined is located at a position away from the first pixel with a threshold value "1" determined. Next, another pixel with a threshold value "1" determined is located at a position away from each of the first and second pixels with a threshold value "1" determined. In the same way, pixels with a threshold value "1" determined are located in the entire area with 512 pixels by 512 pixels until the number of pixels with a threshold value "1" determined becomes 1024 (=512×512/256) in total. After that, a pixel with a threshold value "2" determined is located at a position away from each of the previously located 1024 pixels with a threshold value "1" determined. Next, another pixel with a threshold value "2" determined is located at a position away from each of the previously located 1024 pixels with a threshold value "1" determined and the first pixel with a threshold value "2" determined. In the same way, pixels with a threshold value "2" determined are located in the entire area with 512 pixels by 512 pixels until the number of pixels with a threshold value "2" determined becomes 1024 in total. Subsequently, in the same way, a dither pattern can be set by determining threshold values "1" to "256" with respect to the entire area with 512 pixels by 512 pixels while sequentially incrementing threshold values.

FIGS. 8A, 8B1, 8B2, 8C1, 8C2, 8C3, and 8C4 are diagrams illustrating processes of distribution processing and quantization processing performed on each of the areas A1, A2, and A3 in the present exemplary embodiment.

Here, as an example, as illustrated in FIG. 8A, the case of processing pieces of image data each indicating a value of "128" respectively serving as image data ImA1 in the area A1, image data ImA2 in the area A2, and image data ImA3 in the area A3, which are obtained after the gradation correction processing (step S802), is described.

Pieces of multivalued data MuA1_L, MuA2_L, and MuA3_L corresponding to the recording head 102L and pieces of multivalued data MuA1_R, MuA2_R, and MuA3_R corresponding to the recording head 102 R, which are generated by performing the left-and-right recording head distribution processing (step S803) on the pieces of image data ImA1, ImA2, and ImA3 illustrated in FIG. 8A, are illustrated in FIG. 8B1 and FIG. 8B2, respectively.

Since, as mentioned above, image data corresponding to the area A1 is not distributed to the recording head 102R but is distributed to only the recording head 102L, in the case of processing image data illustrated in FIG. 8A, the multivalued data MuA1_L, which corresponds to the recording head 102L and the area A1, becomes a value of "128", and the multivalued data MuA1_R, which corresponds to the recording head 102R and the area A1, becomes a value of "0". Similarly, since image data corresponding to the area A3 is distributed to only the recording head 102R, the multivalued data MuA3_L, which corresponds to the recording head 102L and the area A3, becomes a value of "0", and the multivalued data MuA3_R, which corresponds to the recording head 102R and the area A3, becomes a value of "128".

Furthermore, whatever data the image data is, the multivalued data MuA1_R, which corresponds to the recording head 102R and the area A1, and the multivalued data MuA3_L, which corresponds to the recording head 102L and the area A3, become a value of "0", and, therefore, the description of the multivalued data MuA1_R and the multivalued data MuA3_L is omitted.

On the other hand, since image data corresponding to the area A2 is distributed to each of the recording heads 102L and 102R with the same value, both the multivalued data MuA2_L, which corresponds to the recording head 102L and the area A2, and the multivalued data MuA2_R, which corresponds to the recording head 102R and the area A2, become a value of "64".

Next, quantization processing which is performed in the present exemplary embodiment is described in detail with processing performed on pieces of multivalued data illustrated in FIGS. 8B1 and 8B2 taken as an example.

FIG. 8C1 illustrates binary data BiA1_L generated by performing quantization processing on the multivalued data MuA1_L. Similarly, FIGS. 8C2, 8C3, and 8C4 illustrate pieces of binary data BiA2_L, BiA2_R, and BiA3_R generated by performing quantization processing on the pieces of multivalued data MuA2_L, MuA2_R, and MuA3_R, respectively. Here, the binary data BiA1_L is data to be used for recording on the area A1 from the recording head 102L, the binary data BiA2_L is data to be used for recording on the area A2 from the recording head 102L, the binary data BiA2_R is data to be used for recording on the area A2 from the recording head 102R, and the binary data BiA3_R is data to be used for recording on the area A3 from the recording head 102R.

Furthermore, while the pieces of binary data BiA1_L, BiA2_L, BiA2_R, and BiA3_R actually have the respective same sizes as those of the corresponding areas A1, A2, and A3, for ease of description, FIGS. 8C1 to 8C4 each illustrate an area having a size of 4 pixels by 4 pixels corresponding to the area 80a in the dither pattern illustrated in FIG. 7B in each piece of binary data. Moreover, in FIGS. 8C1 to 8C4, a pixel with hatched lines drawn from the upper right to the lower left indicates a pixel to which discharge is performed from the recording head 102L, and a pixel with hatched lines drawn from the upper left to the lower right indicates a pixel to which discharge is performed from the recording head 102R.

First, in the present exemplary embodiment, quantization on the multivalued data MuA1_L corresponding to the area A1 and the multivalued data MuA3_R corresponding to the area A3 is performed based on only the dither pattern 80 illustrated in FIG. 7A. Here, since each of the pieces of multivalued data MuA1_L and MuA3_R has a value of "128", pieces of binary data BiA1_L and BiA3_R, each of which indicates discharge of ink with respect to pixels with threshold values equal to or less than "128" determined in the dither pattern 80, are generated. For example, with regard to an area corresponding to the area 80a in the dither pattern 80, as illustrated in FIGS. 8C1 and 8C4, in each of the pieces of binary data BiA1_L and BiA3_R, discharge of ink is determined with respect to pixels with threshold values equal to or less than "128" determined in the area 80a in the dither pattern illustrated in FIG. 7B.

Next, with respect to the multivalued data MuA2_L corresponding to the recording head 102L and the area A2, quantization is also performed based on only the dither pattern 80 illustrated in FIG. 7A. Since the value of the multivalued data MuA2_L is "64", binary data BiA2_L, which indicates discharge of ink with respect to pixels with threshold values equal to or less than "64" determined in the dither pattern 80, is generated. As illustrated in FIG. 8C2, in the binary data BiA2_L, discharge of ink is determined with respect to pixels with threshold values equal to or less than "64" determined in the area 80*a* in the dither pattern.

On the other hand, with respect to the multivalued data MuA2_R corresponding to the recording head 102R and the area A2, quantization is performed based on not only the dither pattern 80 illustrated in FIG. 7A but also the value of the multivalued data MuA2_L corresponding to the recording head 102L and the area A2.

More specifically, first, a dither pattern 80' is generated by subtracting the value determined with respect to each pixel in the multivalued data MuA2_L from the threshold values determined for the respective pixels in the dither pattern 80. Then, quantization processing is performed by applying the dither pattern 80' subjected to subtraction to the multivalued data MuA2_R, so that binary data BiA2_R is generated.

FIGS. 9A and 9B are diagrams illustrating the dither pattern 80' to be generated. Since, as mentioned above, the dither pattern 80' is generated by subtracting the value in the multivalued data MuA2_L from the threshold values in the dither pattern 80, as illustrated in FIG. 9A, the size of the dither pattern 80' subjected to subtraction is 512 pixels by 512 pixels, which is the same as the size of the dither pattern 80 obtained before subtraction.

FIG. 9B illustrates a partial area 80*a*' with a size of 4 pixels by 4 pixels in the dither pattern 80'. Furthermore, the area 80*a*' illustrated in FIG. 9B corresponds to the same area as the area 80*a* illustrated in FIG. 7B.

For example, a threshold value of "112" is determined for the most upper left pixel in the area 80*a* obtained before subtraction illustrated in FIG. 7B, and a value of "64" is determined in the multivalued data MuA2_L illustrated in FIG. 8B1. Accordingly, in the area 80*a*' subjected to subtraction illustrated in FIG. 9B, a threshold value of "48" is thus determined for the most upper left pixel (48=112−64).

Moreover, a threshold value of "240" is determined for the most lower right pixel in the area 80*a* obtained before subtraction illustrated in FIG. 7B, and a value of "64" is determined in the multivalued data MuA2_L illustrated in FIG. 8B1. Accordingly, in the area 80*a*' subjected to subtraction illustrated in FIG. 9B, a threshold value of "176" is thus determined for the most lower right pixel (176=240−64).

Furthermore, in a case where, as a result of subtraction on a given pixel, the value becomes a value equal to or less than "0", the absolute value of the subtraction result is further subtracted from "256", and the further subtraction result is set as a threshold value in the dither pattern 80'. For example, a threshold value of "16" is determined for a pixel located second from the left and first from the top in the area 80*a* obtained before subtraction illustrated in FIG. 7B, and a value of "64" is determined in the multivalued data MuA2_L illustrated in FIG. 8B1. Therefore, the subtraction result becomes "−48". Accordingly, in the area 80*a*' subjected to subtraction illustrated in FIG. 9B, a threshold value of "208" is thus determined for the pixel located second from the left and first from the top (208=256−48).

As a result of using the dither pattern 80' generated as described above, binary data BiA2_R such as that illustrated in FIG. 8C3 is generated. More specifically, since the value of the multivalued data MuA2_R is "64", discharge of ink is thus determined for pixels with threshold values of "64" or less determined in the area 80*a*' in the dither pattern subjected to subtraction.

<Details of Pieces of Binary Data BiA2_L and BiA2_R>

In FIGS. 8C2 and 8C3 described above, only an area with a size of 4 pixels by 4 pixels in each of pieces of binary data BiA2_L and BiA2_R is extracted and described. However, actually, these pieces of binary data BiA2_L and BiA2_R are larger and have the same size as that of the area A2. Here, FIG. 10A illustrates the arrangement of pixels (dot arrangement) in which discharge of ink is determined based on the binary data BiA2_L in an area larger than the size of 4 pixels by 4 pixels in the area A2, and FIG. 10B illustrates the arrangement of pixels (dot arrangement) in which discharge of ink is determined based on the binary data BiA2_R in an area larger than the size of 4 pixels by 4 pixels in the area A2. Furthermore, FIGS. 10A and 10B illustrate a case where data with a value of "128" is input as image data ImA2. Accordingly, here, a case where each of the pieces of multivalued data MuA2_L and MuA2_R has a value of "64" is described. Since, as described above with reference to FIGS. 8A to 8C4, the dither pattern 80 is directly applied to the multivalued data MuA2_L, in FIG. 10A, discharge of ink is determined with respect to pixels with threshold values of 1 to 64 determined in the dither pattern 80. Moreover, with regard to the multivalued data MuA2_R, since "64", which is the value of the multivalued data MuA2_L, is subtracted from the respective threshold values in the dither pattern 80 and threshold values less than "64", which is the value of the multivalued data MuA2_R, are determined based on the dither pattern 80' subjected to subtraction, in this instance, discharge of ink is thus determined with respect to pixels with threshold values of 65 to 128 determined in the dither pattern 80.

As can be seen from comparison between FIG. 10A and FIG. 10B, the dot arrangement formed by the recording head 102R illustrated in FIG. 10B is relatively low in dispersiveness. The dot arrangement in a given area is spatially sparse and the dot arrangement in another area is spatially dense.

On the other hand, the dot arrangement formed by the recording head 102L illustrated in FIG. 10A is relatively high in dispersiveness, and the spatially sparse or dense state of the dot arrangement is almost even regardless of areas.

As mentioned above, dispersiveness of dots can also be evaluated based on spatial frequency characteristics corresponding to the dot arrangement.

FIG. 10C illustrates a power spectrum (indicated by a solid line) in the respective frequency regions of the spatial frequency characteristics corresponding to the dot arrangement formed with the binary data BiA2_L corresponding to the recording head 102L illustrated in FIG. 10A and a power spectrum (indicated by a dashed line) in the respective frequency regions of the spatial frequency characteristics corresponding to the dot arrangement formed with the binary data BiA2_R corresponding to the recording head 102R illustrated in FIG. 10B. Here, to convert the dot arrangement formed with binary data illustrated in FIG. 10A or 10B into spatial frequency characteristics corresponding to the dot arrangement as illustrated in FIG. 10C, a method described in, for example, T. Mitsa and K. J. Parker, "Digital Halftoning using a Blue Noise Mask", Proc. SPIE, Vol. 1452, pp. 47-56 (1991) is used.

In a case where dispersiveness is high, spatial frequency characteristics generally exhibit a property like blue noise characteristics. In other words, low-frequency components become small. Here, it can be seen from FIG. 10C that the spatial frequency characteristics corresponding to the recording head 102L have smaller low-frequency components than the spatial frequency characteristics corresponding to the recording head 102R. In particular, this is conspicuous in a frequency region of 0 to 15 cycles/mm.

Therefore, in the frequency region of 0 to 15 cycles/mm, the integrated value (the value obtained by integrating values in the vertical axis with the range of 0 to 15 in the horizontal axis) of frequency components (power spectrum) corresponding to the recording head 102L is considerably smaller than the integrated value of frequency components corresponding to the recording head 102R. It can be seen from here that the dot arrangement formed by the recording head 102L is higher in dispersiveness than the dot arrangement formed by the recording head 102R.

This is because, as mentioned above, in the dither pattern 80 to be used for the multivalued data MuA2_L corresponding to the recording head 102L and the area A2, the low-frequency components in the spatial frequency characteristics corresponding to the arrangement of pixels with the smallest threshold values (for example, 1 to 64) determined are smaller than the low-frequency components in the spatial frequency characteristics corresponding to the arrangement of pixels with the second smallest threshold values (for example, 65 to 128) determined. Since the dither pattern 80 is directly applied to the multivalued data MuA2_L, in the binary data BiA2_L, discharge of ink is sequentially determined in order from the above-mentioned pixels with the smallest threshold values determined in the dither pattern 80. Therefore, the low-frequency components in the spatial frequency characteristics corresponding to the dot arrangement formed by the recording head 102L become small (high in dispersiveness).

<Arrangement of Dots to be Formed>

With the above-described quantization processing performed, in a case where no discharge position deviation occurs in both of the recording heads 102L and 102R, the dot arrangements which are formed in the respective areas A1, A2, and A3 can be made even. Moreover, in a case where a discharge position deviation occurs in one of the recording heads 102L and 102R, although the dot arrangement which is formed in the area A2 may become slightly different from the dot arrangements which are formed in the areas A1 and A3, image degradation caused by that difference can be prevented or reduced.

Figure 11A:
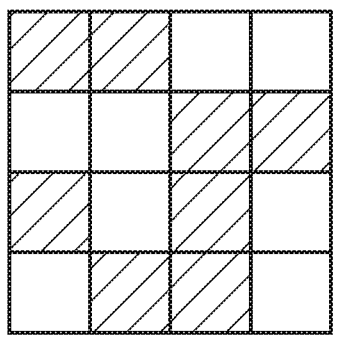
FIGS. 11A, 11B, and 11C are diagrams illustrating dot arrangements in the exemplary embodiment.
Figure 11B:
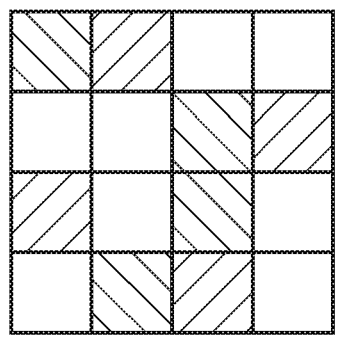
Figure 11C:
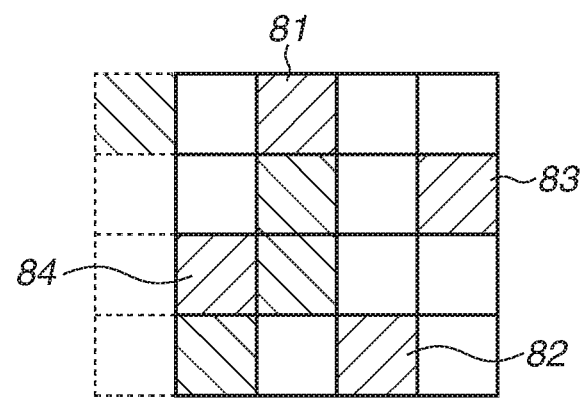

FIGS. 11A, 11B, and 11C are schematic diagrams illustrating the arrangements of dots which are formed in the area A1 and the area A2 as a result of the quantization processing in the present exemplary embodiment. Here, a case where data illustrated in FIG. 8A is input as image data is described. Moreover, a pixel with hatched lines drawn from the upper right to the lower left indicates a dot formed by the recording head 102L, and a pixel with hatched lines drawn from the upper left to the lower right indicates a dot formed by the recording head 102R. Furthermore, here, for ease of description, only the dot arrangement in an area corresponding to the area 80a in the dither pattern 80 in each of the areas A1 and A2 is illustrated.

First, a case where no discharge position deviation occurs in both of the recording heads 102L and 102R is described.

With respect to the area A1, since, as illustrated in FIG. 11A, discharge is performed from only the recording head 102L according to the binary data BiA1_L, dots are arranged at the same pixels as those illustrated in FIG. 8C1.

Moreover, with respect to the area A2, discharge is performed from the recording head 102L according to the binary data BiA2_L and is performed from the recording head 102R according to the binary data BiA2_R. Therefore, if a deviation of discharge position does not occur between the recording heads 102L and 102R, as illustrated in FIG. 11B, dots are arranged at pixels on which discharge is performed according to at least one of the dot arrangements illustrated in FIG. 8C2 and FIG. 8C3.

Here, as can be seen from comparison between FIG. 11A and FIG. 11B, if a deviation of discharge position does not occur between the recording heads 102L and 102R, the dot arrangements which are respectively formed in the areas A1 and A2 become the same. Accordingly, no difference in image quality occurs between images obtained in the area A1 and the area A2.

This is because quantization is performed on each of the pieces of multivalued data MuA1_L and MuA2_L based on the same dither pattern 80 and quantization is performed on the multivalued data MuA2_R based on the dither pattern 80 and the multivalued data MuA2_L.

The multivalued data MuA2_L is half in value (64) in comparison with the multivalued data MuA1_L, but is subjected to quantization using the same dither pattern. Accordingly, the binary data BiA2_L is used to determine discharge of ink with respect to half of the pixels on which discharge of ink is performed according to the binary data BiA1_L (FIG. 8C1 and FIG. 8C2).

Furthermore, in the dither pattern 80', which is applied to the multivalued data MuA2_R, threshold values are determined by subtracting the value of the multivalued data MuA2_L from the respective threshold values in the dither pattern 80. Therefore, with regard to the dither pattern 80', in pixels in which threshold values in the dither pattern 80 are equal to or smaller than the value of the multivalued data MuA2_L, i.e., pixels in which discharge of ink is determined according to the binary data BiA2_L, large threshold values are determined and discharge of ink is unlikely to be determined according to the binary data BiA2_R. Here, pixels with threshold values of 16, 32, 48, and 64 determined in the dither pattern 80 correspond to the above-mentioned pixels.

On the other hand, with regard to pixels in which threshold values in the dither pattern 80 are larger than the value of the multivalued data MuA2_R but the respective differences are small, small threshold values are determined in the dither pattern 80'. Here, pixels with threshold values of 80, 96, 112, and 128 determined in the dither pattern 80 correspond to the above-mentioned pixels, and, in those pixels, threshold values of 16, 32, 48, and 64 are determined in the dither pattern 80' subjected to subtraction. The multivalued data MuA2_R, which has a value of 64, is input to the dither pattern 80', so that, in the binary data BiA2_R, discharge of ink is determined at those four pixels.

Here, pixels with threshold values of 80, 96, 112, and 128 determined in the above-mentioned dither pattern 80 are pixels in which discharge of ink is not determined according to the binary data BiA2_L among the pixels in which discharge of ink is performed according to the binary data BiA1_L. More specifically, half of the pixels in which discharge of ink is determined according to the binary data BiA1_L correspond to the pixels in which discharge of ink is determined according to the binary data BiA2_L, and the remaining half thereof correspond to the pixels in which discharge of ink is determined according to the binary data BiA2_R. In other words, the logical sum of the pixels in which discharge of ink is determined according to the pieces of binary data BiA2_L and BiA2_R becomes the same as the pixels in which discharge of ink is determined according to the binary data BiA1_L. Accordingly, in a case where no discharge position deviation occurs in the recording heads 102L and 102R, the dot arrangements respectively formed in the areas A1 and A2 become the same.

Next, the dot arrangement formed in the area A2 in a case where a discharge position deviation occurs in one of the recording heads 102L and 102R is described.

FIG. 11C is a diagram illustrating the dot arrangement formed in the area A2 by discharge from both of the recording heads 102L and 102R in a case where a discharge position deviation occurs in such a way as to deviate one pixel leftward in discharge from the recording head 102R.

As can be seen from comparison between FIG. 11A and FIG. 11C, in a case where a discharge position deviation occurs in one of the recording heads, the dot arrangements respectively formed in the area A1 and the area A2 may become different from each other. However, there is no large difference between FIG. 11A and FIG. 11C regarding the dispersiveness of dots, i.e., a variation in the sparse or dense state of dots. In this way, in the present exemplary embodiment, since, even if a discharge position deviation occurs in one of the recording heads, the dispersiveness of dots can be made less different between the areas A1 and A2, a decrease in image quality between the areas A1 and A2 can be prevented or reduced.

The reason for this is that low-frequency components in spatial frequency characteristics corresponding to the arrangement of pixels with the smallest threshold values (here, 1 to 64) determined in the dither pattern 80 are reduced and the dispersiveness of those pixels is thus increased.

Since quantization is performed on the multivalued data MuA2_L based on the dither pattern 80, the above-mentioned pixels with the smallest threshold values determined in the dither pattern 80 correspond to pixels in the area A2 in which discharge from the recording head 102L is performed. Therefore, pixels 81, 82, 83, and 84 (FIG. 11C), in which discharge of ink from the recording head 102L is performed in the area A2, become high in dispersiveness.

Here, with regard to only dots formed by one of the recording heads, even if a discharge position deviation occurs between the recording heads 102L and 102R, the dot arrangement does not vary. Accordingly, even when a discharge position deviation occurs, the dispersiveness can be maintained high with respect to the pixels 81, 82, 83, and 84, in which discharge of ink is performed from the recording head 102L. Since the dispersiveness is increased at these pixels 81, 82, 83, and 84, even when a discharge position deviation occurs, the dispersiveness of the dot arrangement in the area A2 can be less decreased in comparison with the dispersiveness of the dot arrangement in the area A1.

As described above, according to the present exemplary embodiment, in a case where no discharge position deviation occurs between two recording heads, the dot arrangements in an overlapping recording area and a non-overlapping recording area can be made the same. Moreover, even in a case where a discharge position deviation occurs, a difference in dispersiveness between the dot arrangements in an overlapping recording area and a non-overlapping recording area can be made small, so that image degradation can be prevented or reduced.

Comparative Embodiment 1

Next, a comparative embodiment 1 related to the first exemplary embodiment is described in detail.

In the comparative embodiment 1, as discussed in U.S. Pat. No. 6,020,976, multivalued data corresponding to an overlapping recording area is quantized, and binary data is distributed to two recording heads with use of distribution patterns.

Figure 12:
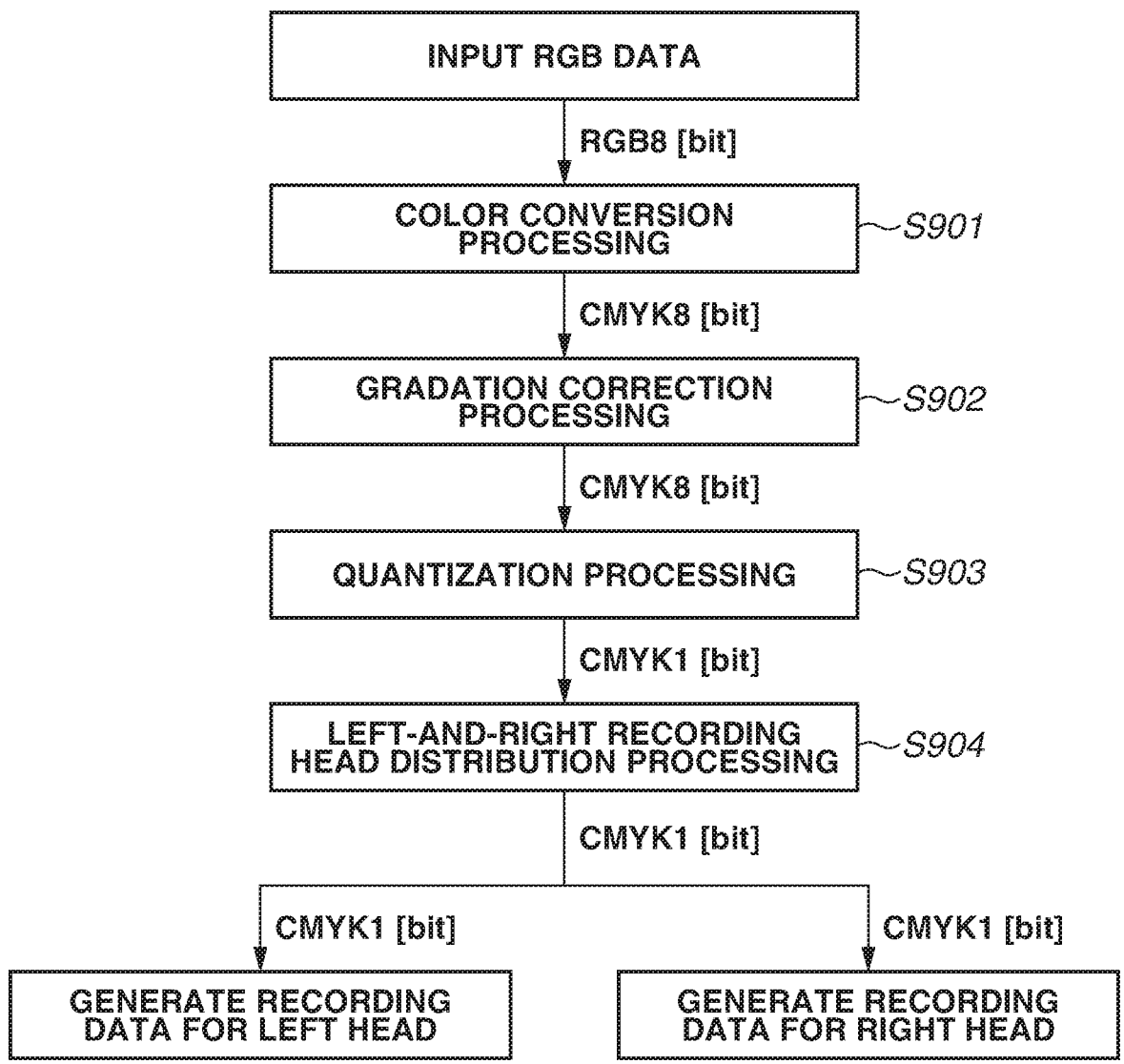
FIG. 12 is a flowchart illustrating a process of image processing in a comparative embodiment.

FIG. 12 is a flowchart of processing for generating recording data to be used for recording, which the CPU 311 performs according to a control program in the comparative embodiment 1.

Processing in steps S901 and S902 is similar to that in steps S801 and S802, respectively, illustrated in FIG. 5, and is, therefore, omitted from description.

Next, in step S903, the CPU 311 quantizes gradation correction data to generate binary data for determining discharge or non-discharge of ink with respect to respective pixels in the areas A1, A2, and A3. During this quantization, as in the first exemplary embodiment, the dither pattern 80 illustrated in FIG. 7A is used.

Then, in step S904, the CPU 311 distributes the binary data to the recording head 102L and the recording head 102R to generate distribution data to be used for recording. Here, since recording in the areas A1 and A3 is respectively performed by only the recording heads 102L and 102R, binary data corresponding to the area A1 is distributed to only the recording head 102L and binary data corresponding to the area A3 is distributed to only the recording head 102R.

Figure 13A:
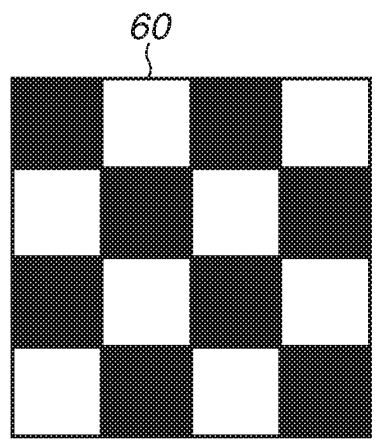
FIGS. 13A and 13B are diagrams illustrating distribution patterns in the comparative embodiment.
Figure 13B:
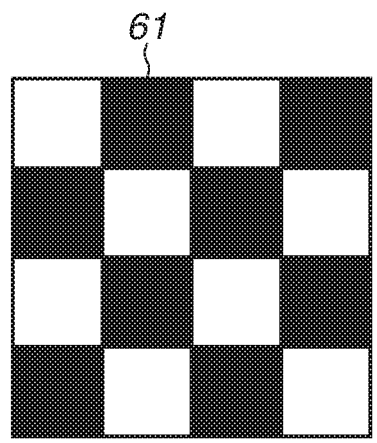

On the other hand, since recording in the area A2 is performed by both of the recording heads 102L and 102R, binary data corresponding to the area A2 is distributed to the recording head 102L and the recording head 102R with use of distribution patterns illustrated in FIGS. 13A and 13B. Here, FIG. 13A illustrates a distribution pattern 60 to be used for distribution to the recording head 102L, and FIG. 13B illustrates a distribution pattern 61 to be used for distribution to the recording head 102R. Furthermore, in the distribution patterns illustrated in FIGS. 13A and 13B, a pixel filled in black indicates a pixel which allows discharge of ink in a case where discharge of ink is determined according to binary data, and an unfilled pixel indicates a pixel which does not allow discharge of ink even in a case where discharge of ink is determined according to binary data. Furthermore, while, here, for ease of description, only an area with 4 pixels by 4 pixels, which is an area corresponding to the area 80' in the dither pattern, is illustrated as each of the distribution patterns 60 and 61, actually, the distribution patterns 60 and 61 have a larger size.

In this way, in the comparative embodiment 1, with respect to each of the areas A1 and A3, ink is discharged according to pieces of binary data respectively corresponding to the recording heads 102L and 102R, obtained by the quantization processing. On the other hand, with respect to the area A2, ink is discharged from the recording head 102L according to distribution data corresponding to the recording head 102L and from the recording head 102R according to distribution data corresponding to the recording head 102R, obtained by the distribution processing.

FIGS. 14A, 14B1, 14B2, 14B3, 14C1, and 14C2 are diagrams illustrating processes of various processing operations performed on the areas A1, A2, and A3 in the comparative embodiment 1.

Here, as an example, as illustrated in FIG. 14A, the case of processing pieces of image data each indicating a value of "128" respectively serving as image data ImB1 in the area A1, image data ImB2 in the area A2, and image data ImB3 in the area A3, which are obtained after the gradation correction processing (step S902), is described.

In the quantization processing (step S903), as mentioned above, the dither pattern 80 illustrated in FIG. 7A is applied to each of the pieces of image data ImB1, ImB2, and ImB3, so that pieces of binary data BiB1 (FIG. 14B1), BiB2 (FIG. 14B2), and BiB3 (FIG. 14B3) respectively corresponding to the areas A1, A2, and A3 are generated. In the comparative embodiment 1, since quantization processing is performed by using the same dither pattern 80 with respect to each piece of image data, if the values of pieces of image data are the same, the dot arrangements formed with pieces of generated binary data become the same. Here, since the values of pieces of image data ImB1, ImB2, and ImB3 are "128", the pieces of binary data BiB1, BiB2, and BiB3 are determined in such a way as to discharge ink with respect to pixels with threshold values of 128 or less determined in the dither pattern 80.

Next, in the distribution processing (step S904), the binary data BiB2 corresponding to the area A2 is distributed with use of the distribution patterns 60 and 61, so that binary data BiB2_L (FIG. 14C1) to be used for discharge from the recording head 102L and binary data BiB2_R (FIG. 14C2) to be used for discharge from the recording head 102R are generated. For example, since, in the binary data BiB2, discharge of ink is determined at the most upper left pixel and allowance of discharge of ink is determined at the most upper left pixel in the distribution pattern 60, discharge of ink is determined at the most upper left in the binary data BiB2_L corresponding to the recording head 102L illustrated in FIG. 14C1. Moreover, in the binary data BiB2, since discharge of ink is determined at a pixel located second from the left and first from the top and allowance of discharge of ink is determined at a pixel located second from the left and first from the top in the distribution pattern 61, discharge of ink is determined at a pixel located second from the left and first from the top in the binary data BiB2_R corresponding to the recording head 102R illustrated in FIG. 14C2.

Figure 15A:
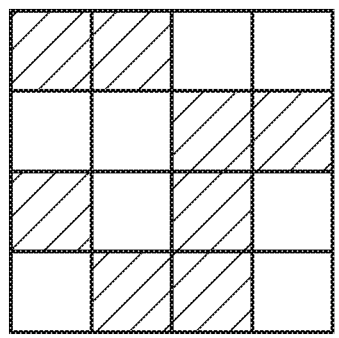
FIGS. 15A, 15B, and 15C are diagrams illustrating dot arrangements in the comparative embodiment.
Figure 15B:
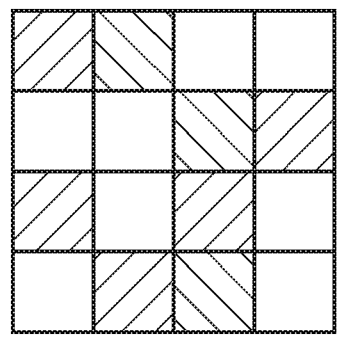
Figure 15C:
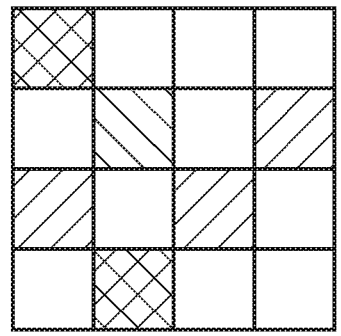

FIGS. 15A, 15B, and 15C are schematic diagrams illustrating the arrangements of dots which are formed in the area A1 and the area A2 as a result of processing in the comparative embodiment 1. Moreover, a pixel with hatched lines drawn from the upper right to the lower left indicates a dot formed by the recording head 102L, and a pixel with hatched lines drawn from the upper left to the lower right indicates a dot formed by the recording head 102R. Moreover, a pixel with both hatched lines drawn from the upper right to the lower left and hatched lines drawn from the upper left to the lower right indicates a dot formed by both the recording heads 102L and 102R. Furthermore, here, for ease of description, only the dot arrangement in an area corresponding to the area 80a in the dither pattern 80 in each of the areas A1 and A2 is illustrated.

First, a case where no discharge position deviation occurs in both of the recording heads 102L and 102R is described.

With respect to the area A1, since, as illustrated in FIG. 15A, discharge is performed from only the recording head 102L according to the binary data BiB1, dots are arranged at the same pixels as those illustrated in FIG. 14B1.

Moreover, with respect to the area A2, discharge is performed from the recording head 102L according to the binary data BiB2_L and is performed from the recording head 102R according to the binary data BiB2 R. Therefore, if a deviation of discharge position does not occur between the recording heads 102L and 102R, as illustrated in FIG. 15B, dots are arranged at pixels on which discharge is performed according to at least one of the dot arrangements illustrated in FIG. 14C1 and FIG. 14C2.

Here, as can be seen from comparison between FIG. 15A and FIG. 15B, if a deviation of discharge position does not occur between the recording heads 102L and 102R, the dot arrangements which are respectively formed in the areas A1 and A2 become the same. Accordingly, no difference in image quality occurs between images obtained in the area A1 and the area A2.

However, as can be seen from FIG. 15B, in the comparative embodiment 1, with respect to the area A2, ink is discharged from the recording head 102L to five pixels and from the recording head 102R to three pixels, so that there is a difference in the amount of discharge between the recording heads 102L and 102R. The difference in the amount of discharge between the recording heads 102L and 102R varies according to a correspondence relationship between the input image data ImB2, the dither pattern 80, and the distribution patterns 60 and 61. Therefore, depending on the input image data ImB2, for example, in the area A2, the binary data BiB2 may sometimes be distributed to only the recording head 102L, so that image degradation resulting from a difference in discharge characteristics between right and left recording heads may not be sufficiently prevented or reduced.

Next, the dot arrangement formed in the area A2 in a case where a discharge position deviation occurs in one of the recording heads 102L and 102R is described.

FIG. 15C is a diagram illustrating the dot arrangement formed in the area A2 by discharge from both of the recording heads 102L and 102R in a case where a discharge position deviation occurs in such a way as to deviate one pixel leftward in discharge from the recording head 102R.

It can be seen from comparison between FIG. 15A and FIG. 15C that, in a case where a discharge position deviation occurs in one of the recording heads, not only the dot arrangements respectively formed in the area A1 and the area A2 differ from each other but also a large difference may occur in dispersiveness. For example, while, in the upper right area of the dot arrangement illustrated in FIG. 15A, discharge of ink is determined to some extent, in the upper right area of the dot arrangement illustrated in FIG. 15C, discharge of ink is hardly determined and paper white is noticeable.

In the comparative embodiment 1, since, after quantization processing is performed on image data ImB2 corresponding to the area A2, distribution processing is performed thereon, even if a dither pattern 80 in which low-frequency components in spatial frequency characteristics corresponding to the arrangement of pixels with the smallest threshold values determined are set small is used, to which of the recording heads 102L and 102R the binary data BiB2 in which discharge of ink is determined with respect to pixels of the quantized image data is distributed is unclear. Therefore, in the comparative embodiment 1, unlike the first exemplary embodiment, ink cannot be discharged from only one of the recording heads to such a position as to increase dispersiveness. Therefore, when a discharge position deviation occurs, a difference in dispersiveness occurs between the areas A1 and A2.

Comparative Embodiment 2

Next, a comparative embodiment 2 related to the first exemplary embodiment is described in detail.

In the comparative embodiment 1, after image data corresponding to an overlapping recording area is distributed to two recording heads, pieces of data obtained by distribution are quantized based on only the same dither pattern.

In the comparative embodiment 2, as in the first exemplary embodiment, recording data generation processing is performed according to the flowchart of FIG. 5. Steps S801 to S803 in the steps illustrated in FIG. 5 are similar to those in the first exemplary embodiment.

Moreover, in step S804L, as in the first exemplary embodiment, quantization using the dither pattern 80 illustrated in FIG. 7A is also performed on multivalued data corresponding to the recording head 102L out of pieces of multivalued data corresponding to the area A2.

Here, in the first exemplary embodiment, in step S804R, the multivalued data corresponding to the area A2 and the recording head 102R is quantized based on the dither pattern 80 and the multivalued data corresponding to the area A2 and the recording head 102L. However, in the comparative embodiment 2, in step S804R, quantization using only the dither pattern illustrated in FIG. 7A is also performed on the multivalued data corresponding to the recording head 102R.

FIGS. 16A, 16B1, 16B2, 16C1, 16C2, 16C3, and 16C4 are diagrams illustrating processes of various processing operations performed on each of the areas A1, A2, and A3 in the comparative embodiment 2.

Here, as an example, as illustrated in FIG. 16A, the case of processing pieces of image data each indicating a value of "128" respectively serving as image data ImC1 in the area A1, image data ImC2 in the area A2, and image data ImC3 in the area A3, which are obtained after the gradation correction processing (step S802), is described.

Since, as mentioned above, the distribution processing is similar to that in the first exemplary embodiment, as illustrated in FIG. 16B1, values indicated by multivalued data MuC1_L corresponding to the area A1 and multivalued data MuC2_L corresponding to the area A2, which are distributed to the recording head 102L, are respectively the same as the values indicated by the multivalued data MuA1_L and the multivalued data MuA2_L illustrated in FIG. 8B1. Similarly, as illustrated in FIG. 16B2, values indicated by multivalued data MuC2_R corresponding to the area A2 and multivalued data MuC3_R corresponding to the area A3, which are distributed to the recording head 102R, are respectively the same as the values indicated by the multivalued data MuA2_R and the multivalued data MuA3_R illustrated in FIG. 8B2.

Furthermore, as mentioned above, each of the pieces of multivalued data MuC1_L, MuC2_L, and MuC3_R is quantized with use of the dither pattern 80 as in the first exemplary embodiment. Therefore, binary data BiC1_L (FIG. 16C1) corresponding to the area A1 and the recording head 102L, binary data BiC2_L (FIG. 16C2) corresponding to the area A2 and the recording head 102L, and binary data BiC3_R (FIG. 16C4) corresponding to the area A3 and the recording head 102R indicate the respective same dot arrangements as the dot arrangements indicated by the pieces of binary data BiA1_L, BiA2_L, and BiA3_R illustrated in FIGS. 8C1, 8C2, and 8C4.

However, in the comparative embodiment 2, the multivalued data MuC2_R is also quantized with use of only the dither pattern 80 as with the multivalued data MuC2_L. Since the values indicated by the pieces of multivalued data MuC2_L and multivalued data MuC2_R are equal to each other, using the same dither pattern causes binary data BiC2_R corresponding to the area A2 and the recording head 102R to indicate the same dot arrangement as that indicated by the binary data BiC2_L, as illustrated in FIG. 16C3.

Figure 17A:
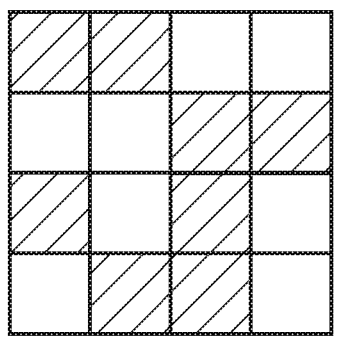
FIGS. 17A, 17B, and 17C are diagrams illustrating dot arrangements in the comparative embodiment.
Figure 17B:
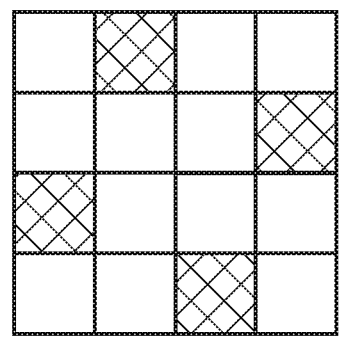
Figure 17C:
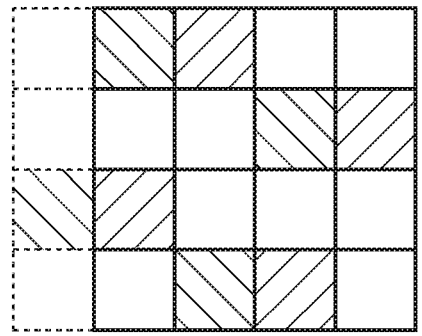

FIGS. 17A, 17B, and 17C are schematic diagrams illustrating the arrangements of dots which are formed in the area A1 and the area A2 as a result of processing in the comparative embodiment 2. A pixel with hatched lines drawn from the upper right to the lower left indicates a dot formed by the recording head 102L, and a pixel with hatched lines drawn from the upper left to the lower right indicates a dot formed by the recording head 102R. Furthermore, here, for ease of description, only the dot arrangement in an area corresponding to the area 80a in the dither pattern 80 in each of the areas A1 and A2 is illustrated.

First, a case where no discharge position deviation occurs in both of the recording heads 102L and 102R is described.

With respect to the area A1, since, as illustrated in FIG. 17A, discharge is performed from only the recording head 102L according to the binary data BiC1_L, dots are arranged at the same pixels as those illustrated in FIG. 16C1.

Moreover, with respect to the area A2, discharge is performed from the recording head 102L according to the binary data BiC2_L and is performed from the recording head 102R according to the binary data BiC2_R. Therefore, if a deviation of discharge position does not occur between the recording heads 102L and 102R, as illustrated in FIG. 17B, dots are arranged at pixels on which discharge is performed according to at least one of the dot arrangements illustrated in FIG. 16C2 and FIG. 16C3. Here, in the comparative embodiment 2, since the dot arrangement illustrated in FIG. 16C2 and the dot arrangement illustrated in FIG. 16C3 become the same, as illustrated in FIG. 17B, if no discharge position deviation occurs, in the area A2, ink is discharged once from every one of the recording heads 102L and 102R with respect to one pixel. As a result, the dot arrangements formed in the respective areas A1 and A2 become greatly different, so that a difference in image quality may occur between the areas A1 and A2.

Next, the dot arrangement formed in the area A2 in a case where a discharge position deviation occurs in one of the recording heads 102L and 102R is described.

FIG. 17C is a diagram illustrating the dot arrangement formed in the area A2 by discharge from both of the recording heads 102L and 102R in a case where a discharge position deviation occurs in such a way as to deviate one pixel leftward in discharge from the recording head 102R.

It can be seen from comparison between FIG. 17A and FIG. 17C that there is not so much difference in dispersiveness, i.e., evenness of the sparse or dense state of the dot arrangement. This is because, as in the first exemplary embodiment, since dispersiveness is maintained high in the dot arrangement formed by one of the recording heads, even if a discharge position deviation occurs between the two recording heads, dispersiveness is not conspicuously impaired.

Comparative Embodiment 3

Next, a comparative embodiment 3 related to the first exemplary embodiment is described in detail.

In the comparative embodiment 3, as in the first exemplary embodiment, after image data corresponding to a non-overlapping recording area is distributed to two recording heads, multivalued data corresponding to one of the two recording heads is quantized with use of a given dither pattern and multivalued data corresponding to the other recording head is quantized with use of the given dither pattern and the multivalued data corresponding to the one recording head. However, unlike the first exemplary embodiment, in the comparative embodiment 3, a dither pattern in which frequency components corresponding to the arrangement of pixels with small threshold values determined are large, i.e., the dispersiveness of small threshold values is low, is used as the given dither pattern.

In the comparative embodiment 3, as in the first exemplary embodiment, recording data generation processing is performed according to the flowchart of FIG. 5. Steps S801 to S803 in the steps illustrated in FIG. 5 are similar to those in the first exemplary embodiment.

In step S804L, the CPU 311 performs quantization on multivalued data corresponding to the area A2 and the recording head 102L by applying a dither pattern 70 which is different from the dither pattern 80 used in the first exemplary embodiment.

Figures 18A, 18B:
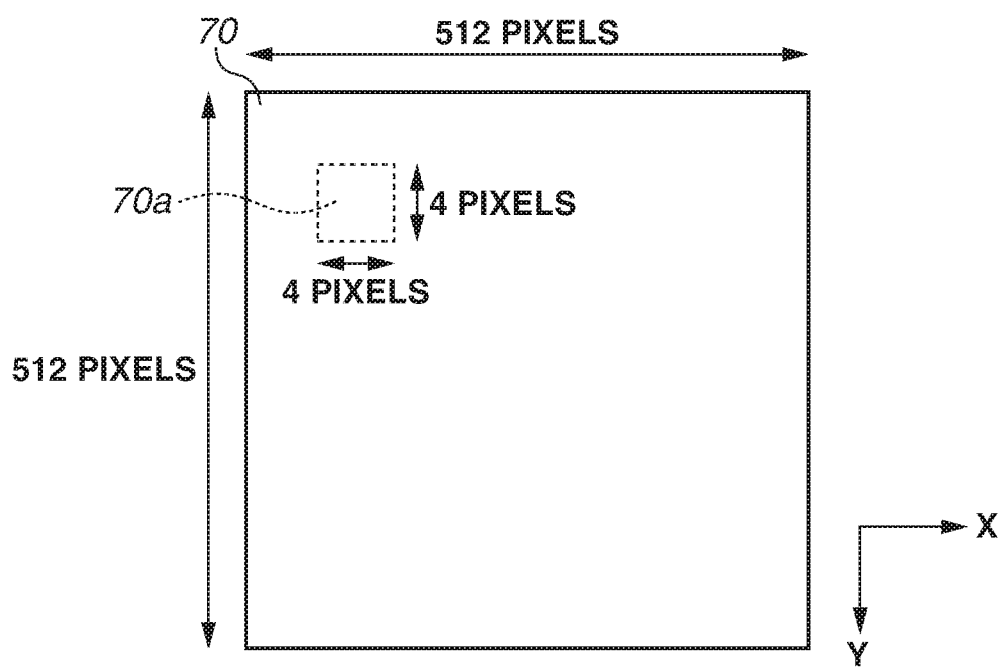
FIGS. 18A and 18B are diagrams illustrating a dither pattern in a comparative embodiment.

FIGS. 18A and 18B are diagrams illustrating the dither pattern 70, which is used in the comparative embodiment 3. The dither pattern 70 illustrated in the comparative embodiment 3 has a size of 512 pixels by 512 pixels as illustrated in FIG. 18A. Furthermore, although not illustrated in FIG. 18A for ease of description, actually, threshold values of 1 to 256 are determined with respect to respective pixels in the 512 pixels by 512 pixels.

FIG. 18B is a diagram illustrating a partial area 70a with a size of 4 pixels by 4 pixels extracted from the dither pattern 70 with a size of 512 pixels by 512 pixels illustrated in FIG. 18A.

As can be seen from FIGS. 18A and 18B, the dither pattern 70 used in the comparative embodiment 3 has threshold values determined with respect to respective pixels in such a manner that low-frequency components in spatial frequency characteristics corresponding to the arrangement of pixels with the smallest threshold values determined become relatively large. In other words, the dispersiveness of pixels with the smallest threshold values determined is set low. More specifically, in the area 70a illustrated in FIG. 18B, four pixels with threshold values of 16, 32, 48, and 64, which are the smallest threshold values, determined are arranged in such a way as to concentrate on the upper left side in the area 70a illustrated in FIG. 18B.

Furthermore, while, here, the area 70a illustrated in FIG. 18B, which is extracted from the dither pattern 70, is described in detail, respective threshold values are determined with respect to the entire area of the dither pattern 70 illustrated in FIG. 18A. More specifically, with regard to "low-frequency components", respective threshold values are determined with respect to the entire area of the dither pattern 70 in such a manner that frequency components in spatial frequency characteristics corresponding to the arrangement of pixels with the smallest threshold values determined become large in comparison with the dither pattern 80 illustrated in FIG. 7A. Moreover, with regard to "dispersiveness", respective threshold values are determined with respect to the entire area of the dither pattern 70 in such a manner that the dispersiveness of pixels with the smallest threshold values determined becomes low in comparison with the dither pattern 80 illustrated in FIG. 7A. Moreover, with regard to "sparse or dense state", respective threshold values are determined with respect to the entire area of the dither pattern 70 in such a manner that the pixels with the smallest threshold values determined are uneven in the sparse or dense state in comparison with the dither pattern 80 illustrated in FIG. 7A.

Next, in step S804R, quantization is performed on the multivalued data corresponding to the area A2 and the recording head 102R based on the dither pattern 70 and the multivalued data corresponding to the area A2 and the recording head 102L. More specifically, the CPU 311 generates a dither pattern 70' by subtracting the value indicated by the multivalued data corresponding to the area A2 and the recording head 102L from the respective threshold values in the dither pattern 70, and performs quantization by applying the dither pattern 70' to the multivalued data corresponding to the area A2 and the recording head 102R.

FIG. 19A is a diagram illustrating a dither pattern 70' which is generated in a case where the value of the multivalued data corresponding to the area A2 and the recording head 102L is "64". The dither pattern 70' subjected to subtraction has a size of 512 pixels by 512 pixels, which is the same as the size of the dither pattern obtained before subtraction.

FIG. 19B illustrates a partial area 70a' with a size of 4 pixels by 4 pixels in the dither pattern 70'. Furthermore, the area 70a' illustrated in FIG. 19B corresponds to the same area as the area 70a illustrated in FIG. 18B.

For example, a threshold value of "144" is determined for the most upper right pixel in the area 70a obtained before subtraction illustrated in FIG. 18B. Since, as mentioned above, here, the value of the multivalued data corresponding to the area A2 and the recording head 102L is "64", in the area 70a' subjected to subtraction illustrated in FIG. 19B, a threshold value of "80" is thus determined for the most upper right pixel (80=144−64).

Furthermore, in a case where, as a result of subtraction on a given pixel, the value becomes a value equal to or less than "0", the absolute value of the subtraction result is further subtracted from "256", and the further subtraction result is set as a threshold value in the dither pattern 70'. For example, a threshold value of "48" is determined for the most upper left pixel in the area 70a obtained before subtraction illustrated in FIG. 18B, and the value of the multivalued data corresponding to the area A2 and the recording head 102L is "64". Therefore, the subtraction result becomes "−16". Accordingly, in the area 70a' subjected to subtraction illustrated in FIG. 19B, a threshold value of "240" is thus determined for the most upper left pixel (240=256−16).

FIGS. 20A, 20B1, 20B2, 20C1, 20C2, 20C3, and 20C4 are diagrams illustrating processes of various processing operations performed on the areas A1, A2, and A3 in the comparative embodiment 3.

Here, as an example, as illustrated in FIG. 20A, the case of processing pieces of image data each indicating a value of "128" respectively serving as image data ImD1 in the area A1, image data ImD2 in the area A2, and image data ImD3 in the area A3, which are obtained after the gradation correction processing (step S802), is described.

Since, as mentioned above, the distribution processing is similar to that in the first exemplary embodiment, as illustrated in FIG. 20B1, values indicated by multivalued data MuD1_L corresponding to the recording head 102L and the area A1 and multivalued data MuD2_L corresponding to the recording head 102L and the area A2 are respectively the same as the values indicated by the multivalued data MuA1_L and the multivalued data MuA2_L illustrated in FIG. 8B1. Similarly, as illustrated in FIG. 20B2, values indicated by multivalued data MuD2_R corresponding to the recording head 102R and the area A2 and multivalued data MuD3_R corresponding to the recording head 102R and the area A3 are respectively the same as the values indicated by the multivalued data MuA2_R and the multivalued data MuA3_R illustrated in FIG. 8B2.

Next, quantization processing is described.

FIG. 20C1 illustrates binary data BiD1_L generated by performing quantization processing on the multivalued data MuD1_L. Similarly, FIGS. 20C2, 20C3, and 20C4 illustrate pieces of binary data BiD2_L, BiD2_R, and BiD3_R generated by performing quantization processing on the pieces of multivalued data MuD2_L, MuD2_R, and MuD3_R, respectively.

Furthermore, in FIGS. 20C1 to 20C4, a pixel with hatched lines drawn from the upper right to the lower left indicates a pixel to which discharge is performed from the recording head 102L, and a pixel with hatched lines drawn from the upper left to the lower right indicates a pixel to which discharge is performed from the recording head 102R.

First, in the comparative embodiment 3, quantization on the multivalued data MuD1_L corresponding to the area A1 and the multivalued data MuD3_R corresponding to the area A3 is performed based on only the dither pattern 70 illustrated in FIG. 18A. Here, since each of the pieces of multivalued data MuD1_L and MuD3_R has a value of "128", pieces of binary data BiD1_L and BiD3_R, each of which indicates discharge of ink with respect to pixels with threshold values equal to or less than "128" determined in the dither pattern 70, are generated. For example, with regard to an area corresponding to the area 70a in the dither pattern 70, as illustrated in FIGS. 20C1 and 20C4, in each of the pieces of binary data BiD1_L and BiD3_R, discharge of ink is determined with respect to pixels with threshold values equal to or less than "128" determined in the area 70a in the dither pattern illustrated in FIG. 18B.

Next, with respect to the multivalued data MuD2_L corresponding to the recording head 102L and the area A2, quantization is also performed based on only the dither pattern 70 illustrated in FIG. 18A. Since the value of the multivalued data MuD2_L is "64", binary data BiD2_L, which indicates discharge of ink with respect to pixels with threshold values equal to or less than "64" determined in the dither pattern 70, is generated. As illustrated in FIG. 20C2, in the binary data BiD2_L, discharge of ink is determined with respect to pixels with threshold values equal to or less than "64" determined in the area 70a in the dither pattern.

Then, with respect to the multivalued data MuD2_R corresponding to the recording head 102R and the area A2, quantization is performed based on the threshold values of the dither pattern 70 illustrated in FIG. 18A and the value of the multivalued data MuD2_L corresponding to the recording head 102L and the area A2.

First, as mentioned above, a dither pattern 70' is generated by subtracting the value of the multivalued data MuD2_L corresponding to the recording head 102L and the area A2 from the threshold values of the dither pattern 70. Here, since, as illustrated in FIG. 20B1, the value of the multivalued data MuD2_L corresponding to the recording head 102L and the area A2 is "64", a dither pattern 70' such as that illustrated in FIG. 19A is generated.

Then, quantization of the multivalued data MuD2_R is performed with use of the dither pattern 70' subjected to subtraction, so that binary data BiD2_R is generated. Since the value of the multivalued data MuD2_R is "64", as illustrated in FIG. 20C3, discharge of ink is thus determined with respect to pixels with threshold values equal to or less than "64" determined in the area 70a' in the dither pattern subjected to subtraction.

Figure 21A:
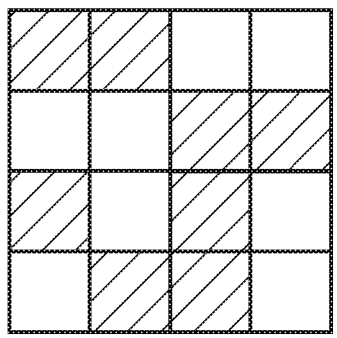
FIGS. 21A, 21B, and 21C are diagrams illustrating dot arrangements in the comparative embodiment.
Figure 21B:
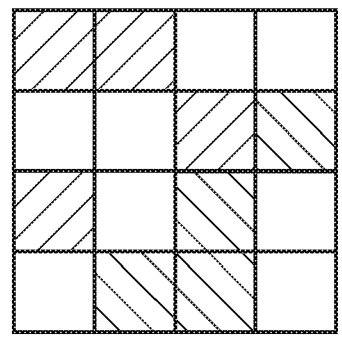
Figure 21C:
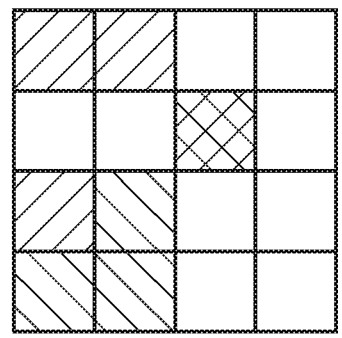

FIGS. 21A, 21B, and 21C are schematic diagrams illustrating the arrangements of dots which are formed in the area A1 and the area A2 as a result of processing in the comparative embodiment 3. A pixel with hatched lines drawn from the upper right to the lower left indicates a dot formed by the recording head 102L, and a pixel with hatched lines drawn from the upper left to the lower right indicates a dot formed by the recording head 102R. Furthermore, here, for ease of description, only the dot arrangement in an area corresponding to the area 70a in the dither pattern 70 in each of the areas A1 and A2 is illustrated.

First, a case where no discharge position deviation occurs in both of the recording heads 102L and 102R is described.

With respect to the area A1, since, as illustrated in FIG. 21A, discharge is performed from only the recording head 102L according to the binary data BiD1_L, dots are arranged at the same pixels as those illustrated in FIG. 20C1.

Moreover, with respect to the area A2, discharge is performed from the recording head 102L according to the binary data BiD2_L and is performed from the recording head 102R according to the binary data BiD2_R. Therefore, if a deviation of discharge position does not occur between the recording heads 102L and 102R, as illustrated in FIG. 21B, dots are arranged at pixels on which discharge is performed according to at least one of the dot arrangements illustrated in FIG. 20C2 and FIG. 20C3.

Here, as can be seen from comparison between FIG. 21A and FIG. 21B, if a deviation of discharge position does not occur between the recording heads 102L and 102R, the dot arrangements respectively formed in the areas A1 and A2 become the same. Accordingly, a difference does not occur in the image quality between images obtained in the areas A1 and A2.

Next, the dot arrangement formed in the area A2 in a case where a discharge position deviation occurs in one of the recording heads 102L and 102R is described.

FIG. 21C is a diagram illustrating the dot arrangement formed in the area A2 by discharge from both of the recording heads 102L and 102R in a case where a discharge position deviation occurs in such a way as to deviate one pixel leftward in discharge from the recording head 102R.

It can be seen from comparison between FIG. 21A and FIG. 21C that, in a case where a discharge position deviation occurs in one of the recording heads, not only the dot arrangements respectively formed in the area A1 and the area A2 differ from each other but also a large difference may occur in dispersiveness. For example, while, in the lower right area of the dot arrangement illustrated in FIG. 21A, discharge of ink is determined to some extent, in the lower right area of the dot arrangement illustrated in FIG. 21C, discharge of ink is hardly determined and paper white is noticeable.

This is because, in the comparative embodiment 3, since a dither pattern in which low-frequency components in spatial frequency characteristics corresponding to the arrangement of pixels with small threshold values determined are large is used, the dispersiveness of the dot arrangement formed by only the recording head 102L becomes low, so that a local deviation occurs. As a result, when a discharge position deviation occurs, a difference in dispersiveness occurs between the areas A1 and A2.

As described above, any of the comparative embodiments 1 to 3 cannot achieve both of two operations including equalizing the dot arrangement between an overlapping recording area and a non-overlapping recording area in a case where a discharge position deviation between two recording heads does not occur and reducing a difference in dispersiveness of the dot arrangement between an overlapping recording area and a non-overlapping recording area even in a case where a discharge position deviation occurs.

In the above-described first exemplary embodiment, a configuration in which, in step S803, image data ImA2 is distributed to the recording head 102L and the recording head 102R in such a manner that the values indicated by the multivalued data MuA2_L and the multivalued data MuA2_R become equal to each other regardless of positions in the X-direction in the area A2 has been described. In other words, in the first exemplary embodiment, respective pieces of image data with the same amount are distributed to the recording head 102L and the recording head 102R regardless of positions in the X-direction in the area A2.

On the other hand, in a second exemplary embodiment, a configuration in which image data with a more amount is distributed to the recording head 102L in positions in the area A2 close to the area A1 and image data with a more amount is distributed to the recording head 102R in positions in the area A2 close to the area A3 is described.

Furthermore, portions similar to those in the above-described first exemplary embodiment are omitted from description.

FIG. 22 is a diagram illustrating a distribution ratio of image data in each area in step S803 in the second exemplary embodiment. Furthermore, in FIG. 22, a thick solid line indicates a distribution ratio for distribution to the recording head 102L, and a thick dashed line indicates a distribution ratio for distribution to the recording head 102R.

As mentioned in the first exemplary embodiment, the area A1 is an area in which recording is performed by only the recording head 102L, and the area A3 is an area in which recording is performed by only the recording head 102R. Accordingly, as illustrated in FIG. 22, the distribution ratio for distribution to the recording head 102L becomes 100% in the area A1, and the distribution ratio for distribution to the recording head 102R becomes 100% in the area A3.

On the other hand, in the area A2, as illustrated in FIG. 22, distribution ratios are determined in such a manner that, as the position in the X-direction moves from the area A1 side (a first area side) to the area A3 side (a third area side), the distribution ratio for distribution to the recording head 102L gradually decreases and the distribution ratio for distribution to the recording head 102R gradually increases.

As can be seen from FIG. 22, while, in the area A2, the distribution ratio for distribution to the recording head 102L and the distribution ratio for distribution to the recording head 102R vary according to positions in the X-direction, the sum of those becomes 100% regardless of positions in the X-direction. It can be seen from this that, even when the distribution processing in the present exemplary embodiment is performed, the amount of discharge of ink for the area A2 does not greatly differ from the amount of discharge of ink for the areas A1 and A3.

Furthermore, even if a difference in discharge characteristics occurs between the recording head 102L and the recording head 102R, gradually varying the distribution ratio as illustrated in FIG. 22 enables reducing density unevenness between the areas A1 and A3 caused by the difference in discharge characteristics. For example, in a case where such a difference in discharge characteristics that the amount of discharge of ink of the recording head 102L is larger than the amount of discharge of ink of the recording head 102R occurs, the density becomes high (the image becomes dark) in the area A1, in which recording is performed by the recording head 102L, and the density becomes low (the image becomes light) in the area A3, in which recording is performed by the recording head 102R. If such images different in density are recorded at adjacent positions, a steep change in density appears, so that density unevenness becomes easily noticeable. However, in the present exemplary embodiment, since the distribution ratios for the recording heads 102L and 102R are gradually varied in the area A2, the density of an image also gradually varies along the X-direction. Accordingly, no steep change occurs, so that density unevenness can be reduced.

Furthermore, in the present exemplary embodiment, respective quantization processing operations in steps S804L and S804R are made different from each other according to positions in the X-direction in the area A2.

More specifically, in the present exemplary embodiment, in positions in the area A2 closer to the area A1 than the area A3, in other words, in positions in which the value of the multivalued data MuA2_L is larger than the value of the multivalued data MuA2_R, as in the first exemplary embodiment, the dither pattern 80 is used to quantize the multivalued data MuA2_L, and the dither pattern 80 and the multivalued data MuA2_L are used to quantize the multivalued data MuA2_R. This enables increasing the dispersiveness of the dot arrangement formed by the recording head 102L, which has a high ratio to contribute to the area A2.

On the other hand, in positions in the area A2 closer to the area A3 than the area A1, in other words, in positions in which the value of the multivalued data MuA2_L is smaller than the value of the multivalued data MuA2_R, processing different from that in the first exemplary embodiment is performed. More specifically, the dither pattern 80 is used to quantize the multivalued data MuA2_R, and the dither pattern 80 and the multivalued data MuA2_R are used to quantize the multivalued data MuA2_L. Therefore, the dispersiveness of the dot arrangement becomes high not in the binary data BiA2_L but in the binary data BiA2_R. This enables increasing the dispersiveness of the dot arrangement formed by the recording head 102R in positions in which the recording head 102R has a higher ratio to contribute to the area A2 than the recording head 102L.

In this way, according to the present exemplary embodiment, the dispersiveness of the dot arrangement formed by a recording head which has a higher ratio to contribute to the area A2 out of the recording heads 102L and 102R can be increased, so that a difference in the dispersiveness of the dot arrangement between the areas A1, A2, and A3 can be more adequately reduced.

Furthermore, while, in the description of each of the above-described exemplary embodiments, the dither pattern 80' is generated by subtracting the value of the multivalued data MuA2_L from the threshold values in the dither pattern 80 and the multivalued data MuA2_R is quantized with use of the dither pattern 80', another configuration can also be employed. For example, such a configuration can also be employed that, to quantize the multivalued data MuA2_R, the value of the multivalued data MuA2_L is added to the value of the multivalued data MuA2_R and the multivalued data MuA2_R subjected to addition is quantized with use of the dither pattern 80. In this case, it is desirable that discharge of ink be determined with respect to pixels in which the value of the multivalued data MuA2_R subjected to addition is equal to or greater than the respective threshold values in the dither pattern 80 and the multivalued data MuA2_R obtained before addition is less than the respective threshold values in the dither pattern 80.

When the multivalued data MuA2_R illustrated in FIG. 8B2 is taken as an example for more detailed description, since the value of the multivalued data MuA2_R obtained before addition "64" and the value of the multivalued data MuA2_R subjected to addition is "128(=64+64)", such recording data BiA2_R that discharge of ink is performed with respect to pixels with threshold values of 65 to 128 determined in the dither pattern illustrated in FIG. 7A is generated. In terms of the area 80a in the dither pattern illustrated in FIG. 7B, binary data BiA2_R which determines discharge of ink with respect to pixels with threshold values of 80, 96, 112, and 128 determined, which satisfy the above-mentioned condition, is generated, so that it can be seen that this coincides with the binary data BiA2_R generated in the first exemplary embodiment illustrated in FIG. 8C3.

Moreover, while, in the description of each of the above-described exemplary embodiments, color conversion processing, gradation correction processing, distribution processing, and quantization processing are performed in the process of image processing as illustrated in FIG. 5, another processing operation can also be additionally performed. For example, correction processing for reducing density unevenness resulting from a difference in discharge characteristics between recording heads, i.e., what is called head shading, can also be performed. In head shading, first, reference image data is input to record a test chart on a recording medium, and the density of the test chart is read by a sensor (not illustrated) mounted in the recording apparatus. Then, the density indicated by the reference image data and the density indicated by the test chart are compared with each other, so that correction values which are applied when actual image data is input are calculated. For example, in a case where the density indicated by a test chart recorded by the recording head 102L is 10% higher than the density indicated by the reference image data, such a deviation in discharge characteristics as to increase the amount of discharge occurs in the discharge ports of the recording head 102L. Therefore, when actual image data is input, prior to the quantization processing in step S804L, correction processing for reducing the value of the multivalued data MuA2_L by approximately 10% is performed. Performing this head shading enables recording an image with less density unevenness even when a deviation in discharge characteristics occurs between the recording heads 102L and 102R.

Figure 23:
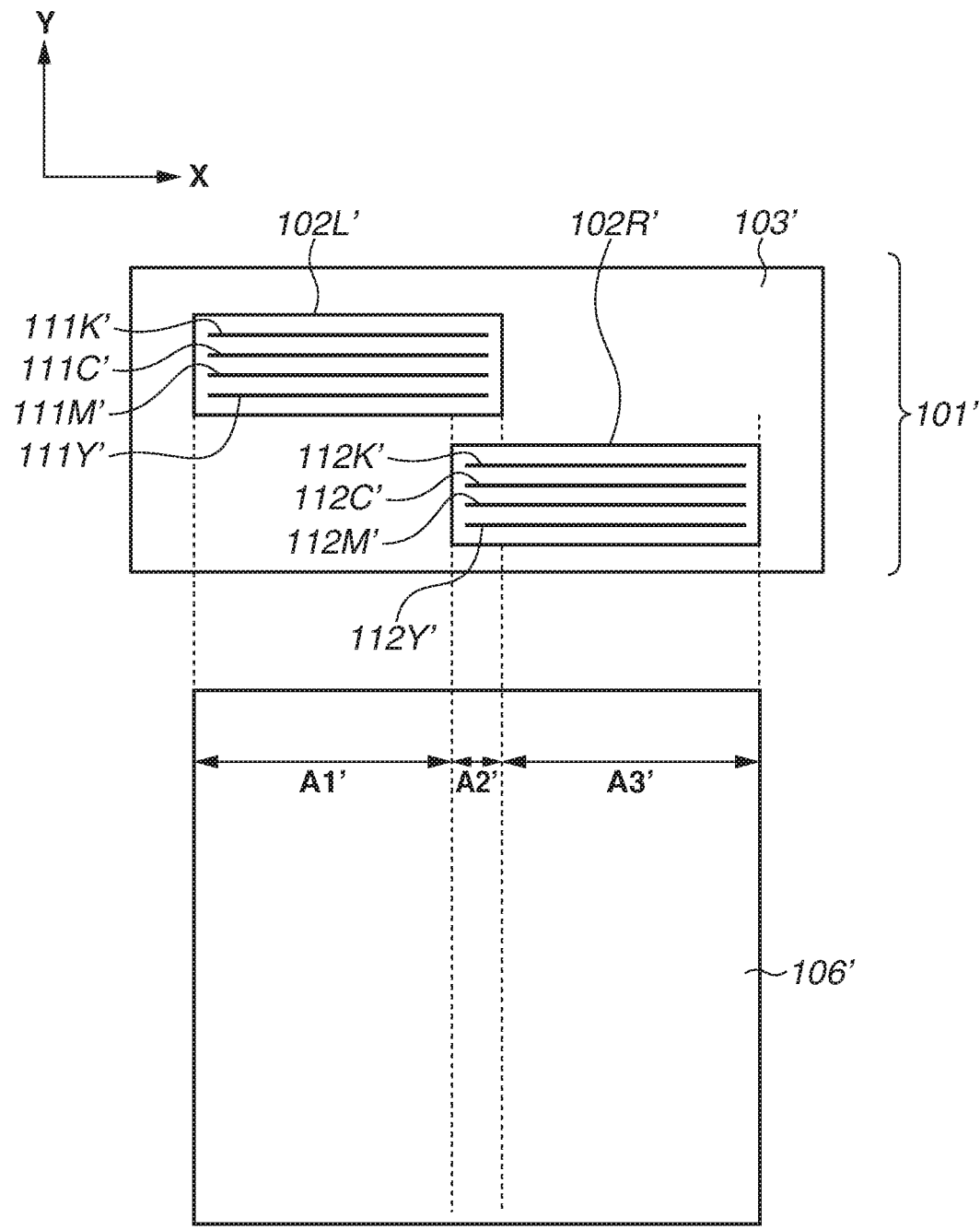
FIG. 23 is a diagram illustrating a recording unit and a recording method according to the exemplary embodiment.

Furthermore, while, in the description of each of the above-described exemplary embodiments, a recording unit in which two recording heads in each of which discharge port arrays each including a plurality of discharge ports arrayed along the Y-direction are arranged side by side along the X-direction are arranged at positions away from each other along the X-direction, as illustrated in FIG. 1, FIGS. 2A and 2B, and FIG. 3, is used, another configuration can also be employed. FIG. 23 is a diagram illustrating another recording apparatus to which the aspect of the embodiments can be applied. Here, in each discharge port tray, a plurality of discharge ports is arrayed along the X-direction. In a recording head 102L', a discharge port array 111K' for black ink, a discharge port array 111C' for cyan ink, a discharge port array 111M' for magenta ink, and a discharge port array 111Y' for yellow ink are arranged side by side along the Y-direction. Moreover, in a recording head 102R', a discharge port array 112K' for black ink, a discharge port array 112C' for cyan ink, a discharge port array 112M' for magenta ink, and a discharge port array 112Y' for yellow ink are arranged side by side along the Y-direction. Then, in a recording unit 101', the recording head 102L' and the recording head 102R' are arranged at such positions as to enable the recording heads 102L' and 102R' to discharge ink in common to a partial area A2' on a recording medium 106'. Each exemplary embodiment can also be applied to a configuration in which, during scanning movement of such a recording unit 101' in the Y-direction, ink is discharged from only the recording head 102L' onto an area A1' on the recording medium 106', ink is discharged from only the recording head 102R' onto an area A3', and ink is discharged from both of the recording heads 102L' and 102R' onto the area A2'. More specifically, first, pieces of multivalued data corresponding to the areas A1' and A3' are quantized with use of only the dither pattern 80. Moreover, multivalued data corresponding to the area A2' and the recording head 102L' is also quantized with use of only the dither pattern 80. Then, multivalued data corresponding to the area A2' and the recording head 102R' is quantized with use of the dither pattern 80 and the multivalued data corresponding to the area A2' and the recording head 102L', so that beneficial effects similar to those in each exemplary embodiment can be attained.

Furthermore, while, in the description of each of the above-described exemplary embodiments, quantization is performed on each piece of multivalued data MuA1_L, MuA2_L, MuA2_R, and MuA3_R with use of the same dither pattern 80, although only on multivalued data MuA2_R with additional use of the multivalued data MuA2_L, as illustrated in FIGS. 8A to 8C4, another configuration can also be employed. While, as mentioned above, the dither pattern 80 used in each exemplary embodiment has a size of 512 pixels by 512 pixels, if the arrangements of pixels with respective threshold values determined in the 512 pixels by 512 pixels are almost the same, respective different dither patterns can be used for pieces of multivalued data MuA1_L, MuA2_L, MuA2_R, and MuA3_R. However, to approximately equalize the dot arrangements formed in the areas A1, A2, and A3, even in the case of using the above-mentioned respective different dither patterns, the arrangements of pixels with respective threshold values determined are to be almost the same, and it is desirable that the arrangements be the same in 90% or more of the pixels in each dither pattern. Furthermore, to most adequately attain beneficial effects in each exemplary embodiment, it is naturally desirable that the same dither pattern be used for the pieces of multivalued data MuA1_L, MuA2_L, MuA2_R, and MuA3_R. Furthermore, in the context of the present specification, for ease of description, "the same dither pattern" is referred to as long as the arrangements are the same in 90% or more of the pixels in each dither pattern.

Moreover, while, in the description of each of the above-described exemplary embodiments, any of threshold values 1 to 256 is determined in each pixel in the dither pattern 80 and low-frequency components in spatial frequency characteristics corresponding to the arrangement of pixels with threshold values of 1 to 64 determined are smaller than low-frequency components in spatial frequency characteristics corresponding to the arrangement of pixels with threshold values of 65 to 128 determined, another configuration can also be employed. The width of threshold values in which the low-frequency components are small (in each exemplary embodiment, since the low-frequency components are small in threshold values "1" to "64", the width of threshold values is "64") can be varied as appropriate, and, for example, low-frequency components in spatial frequency characteristics corresponding to the arrangement of pixels with threshold values of 1 to 32 determined can be smaller than low-frequency components in spatial frequency characteristics corresponding to the arrangement of pixels with threshold values of 33 to 64 determined. Moreover, low-frequency components in spatial frequency characteristics corresponding to the arrangement of pixels with threshold values of 1 to 64 determined can be smaller than low-frequency components in spatial frequency characteristics corresponding to the arrangement of pixels with threshold values of 33 to 96 determined. Additionally, low-frequency components in spatial frequency characteristics corresponding to the arrangement of pixels with threshold values of 1 to 128 determined can be smaller than low-frequency components in spatial frequency characteristics corresponding to the arrangement of pixels with threshold values of 129 to 256 determined.

Actually, low-frequency components in spatial frequency characteristics corresponding to the arrangement of pixels with threshold values of 1 to j (j being an integer satisfying j>1) determined can be smaller than low-frequency components in spatial frequency characteristics corresponding to the arrangement of pixels with threshold values of k to (k+j−1) determined. Here, as a condition for the above-mentioned k, when the maximum value of threshold values determined in a dither pattern is M (in each exemplary embodiment, M=256), the conditions (1) k≥2 and (2) k+j−1≤M, i.e., 2≤k≤M−j+1 are to be satisfied. With regard to description of the reason for the conditions (1) and (2), first, since, in the present exemplary embodiment, the arrangement in a dither pattern is determined in such a manner that dispersiveness is higher in smaller threshold values, the dispersiveness of a pixel with a threshold value "1" determined is to be higher than the dispersiveness of a pixel with another threshold, for example, a threshold value "65", determined. Therefore, low-frequency components in spatial frequency characteristics corresponding to the arrangement of pixels with threshold values of 1 to j determined are to be smaller than low-frequency components in spatial frequency characteristics corresponding to the arrangement of pixels with threshold values of k to (k+j−1), excluding at least a threshold value of "1", determined. For this reason, the above condition (1) is applied. Moreover, the above condition (2) is applied because, in calculating low-frequency components in a width of threshold values of K to (k+j−1), (k+j−1), which is the largest value in the width, is to be equal to or less than the maximum value (M) of threshold values determined in the dither pattern.

Furthermore, while, in the description of the above condition (1), at least k≥2 is applied, and in one embodiment, the value of k be the larger one. Depending on, for example, the size of a dither pattern, the maximum value of threshold values, or the diameter of each dot formed on a recording medium, even when the dispersiveness of pixels with a threshold value of "1" determined in the dither pattern is increased to the maximum, a large number of gaps may still be sometimes present in the pixel density in the dither pattern. In such a case, the dispersiveness of pixels can be sufficiently increased with respect to a threshold value smallest next to "1", i.e., a threshold value of "2", so that the dispersiveness of pixels with a threshold value of "1" determined and the dispersiveness of pixels with a threshold value of "2" determined are not so much different from each other. In view of this respect, the value of the above k is to be larger to some extent than "2" and, actually, satisfy a condition of k≥M/16. In each exemplary embodiment, since M=256 is set, k≥16 results. If the dispersiveness of pixels with threshold values of "1" to "15" determined is increased, the dispersiveness of pixels with a larger threshold value such as "16" determined has to be decreased.

If the above-described condition is satisfied, as long as the value of the input multivalued data MuA2_L is at least equal to or less than j, beneficial effects similar to those in each exemplary embodiment can be attained. Furthermore, in making a comparison between low-frequency components, in one embodiment, the widths of threshold values be the same, and, in the above condition, the width of threshold values of 1 to j is (j−1) and the width of threshold values of k to (k+j−1) is (k+j−1)−k=(j−1), which are thus the same. Moreover, in making a comparison between the widths of consecutive threshold values such as those described in each exemplary embodiment (for example, 1 to 64 and 65 to 128), a condition of k=(j+1) is to be satisfied. Furthermore, actually, since it is desirable to make a comparison in low-frequency components corresponding to spatial frequency characteristics between areas in which the widths of threshold values do not overlap (for example, threshold values of 1 to 64 and threshold values of 65 to 128 or threshold values of 1 to 64 and threshold values of 193 to 256), it is desirable to satisfy k>j.

Furthermore, in making a comparison in low-frequency components corresponding to spatial frequency characteristics as mentioned above, in a dither pattern, the number of pixels with threshold values of 1 to j determined and the number of pixels with threshold values of k to (k+j−1) determined be the same.

Figure 24A:
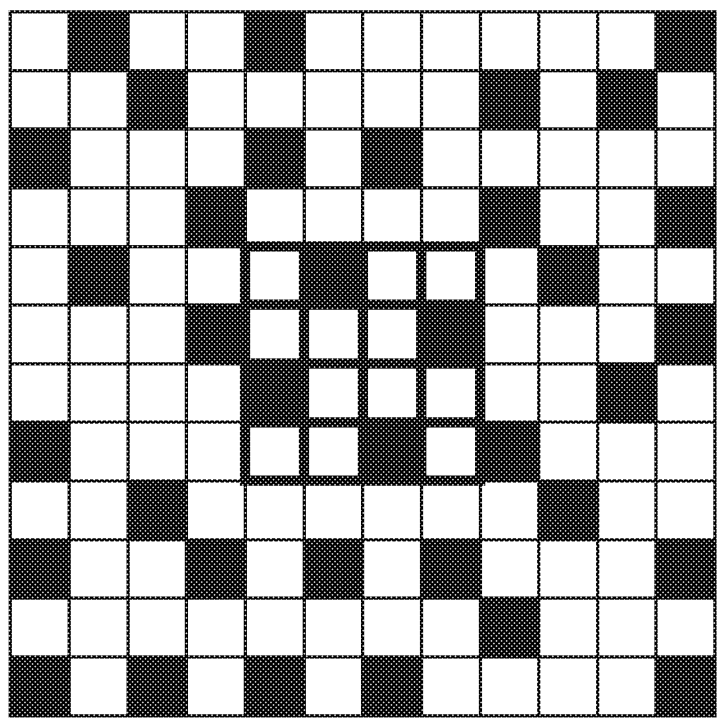
FIGS. 24A and 24B are diagrams illustrating dither patterns in the exemplary embodiment.
Figure 24B:
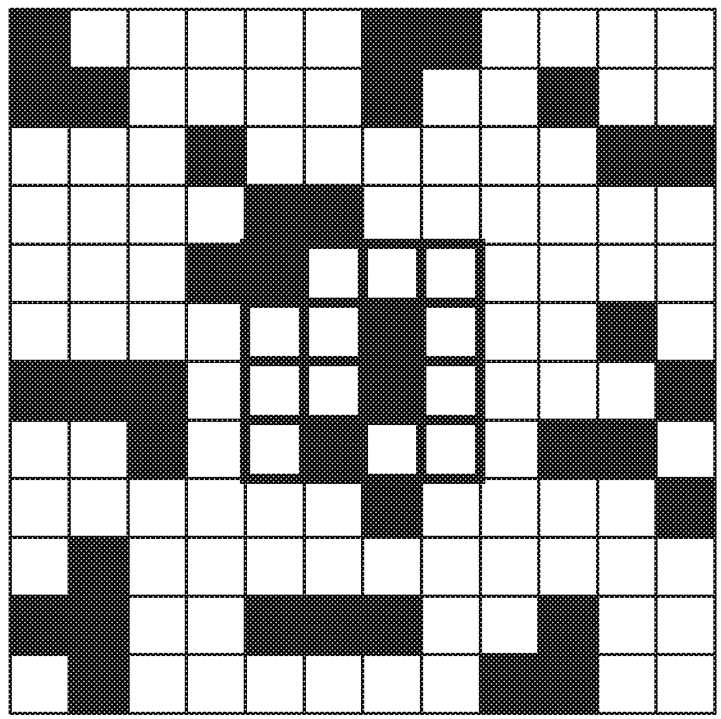

Furthermore, while, in FIGS. 7B, 7C, and 7D, for ease of description, the area 80*a* with a size of 4 pixels by 4 pixels is extracted from the dither pattern 80 with a size of 512 pixels by 512 pixels and is thus described, as mentioned with reference to FIG. 7A, respective threshold values are arranged according to the same rule as that of the area 80*a* in the entire area of 512 pixels by 512 pixels. More specifically, with regard to "low-frequency components", respective threshold values are determined with respect to the entire area of the dither pattern 80 in such a manner that frequency components in spatial frequency characteristics corresponding to the arrangement of pixels with the smallest threshold values (1 to 64) determined are smaller than frequency components in spatial frequency characteristics corresponding to the arrangement of pixels with the second smallest threshold values (65 to 128) determined, with regard to "dispersiveness", respective threshold values are determined with respect to the entire area of the dither pattern 80 in such a manner that the dispersiveness of pixels with the smallest threshold values determined is higher than the dispersiveness of pixels with the second smallest threshold values determined, and with regard to "sparse or dense state", respective threshold values are determined with respect to the entire area of the dither pattern 80 in such a manner that the pixels with the smallest threshold values determined are almost even in the sparse or dense state and the pixels with the second smallest threshold values determined are uneven in the sparse or dense state. FIG. 24A illustrates, by blocks filled in black, pixels with the smallest threshold values (1 to 64) arranged in an area with a size of 12 pixels by 12 pixels including the area 80*a* with a size of 4 pixels by 4 pixels illustrated in FIG. 7C. Moreover, FIG. 24B illustrates, by blocks filled in black, pixels with the second smallest threshold values (65 to 128) arranged in an area with a size of 12 pixels by 12 pixels including the area 80*a* with a size of 4 pixels by 4 pixels illustrated in FIG. 7D. Furthermore, the areas with a size of 4 pixels by 4 pixels drawn with thick lines in FIGS. 24A and 24B correspond to the areas illustrated in FIGS. 7C and 7D, respectively. As can be seen from FIG. 24A, the dither pattern 80 is determined in such a manner that, in not only the area 80*a* with a size of 4 pixels by 4 pixels but also the area with a size of 12 pixels by 12 pixels, "dispersiveness" is high, "sparse or dense state" is almost even, and "low-frequency components" are small in the arrangement of pixels with the smallest threshold values (1 to 64) determined. Moreover, as can be seen from FIG. 24B, the dither pattern 80 is determined in such a manner that, in not only the area 80*a* but also the area with a size of 12 pixels by 12 pixels, "dispersiveness" is low, "sparse or dense state" is uneven, and "low-frequency components" are large in the arrangement of pixels with the second smallest threshold values (65 to 128) determined.

Furthermore, while, in the description of each of the above-described exemplary embodiments, a recording unit includes a recording head 102L and a recording head 102R which are provided away from each other to some extent, in one embodiment, the distance W by which the recording head 102L and the recording head 102R are away from each other be longer than the distance d between discharge port arrays in each of the recording heads. Furthermore, since the longer distance between recording heads enables reducing a recording time, in one embodiment, the recording heads be away from each other by such a distance as to attain an intended recording time.

Moreover, while, in the description of each of the above-described exemplary embodiments, each recording head includes four discharge port arrays for respectively discharging cyan ink, magenta ink, yellow ink, and black ink, a configuration in which each recording head includes discharge port arrays for respectively discharging different color inks can be employed. Moreover, a plurality of discharge port arrays for discharging the same color ink can be included in each recording head.

Furthermore, while, in the description of each of the above-described exemplary embodiments, one discharge port array is configured with one array including a plurality of discharge ports for discharging the same type of ink arrayed along the Y-direction, another configuration can also be employed. For example, one discharge port array can be configured in such a manner that the discharge port array includes two arrays in each of which a plurality of discharge ports for discharging the same type of ink is arrayed along the Y-direction and the two arrays are arranged at positions shifting from each other along the X-direction and shifting from each other along the Y-direction in such a way as to enable each discharge port of one array to discharge ink to between discharge ports of the other array.

Furthermore, while, in the description of each of the above-described exemplary embodiments, a recording unit includes two different recording heads and a holding portion which holds the recording heads, another configuration can also be employed. More specifically, as long as a recording unit includes a first recording section and a second recording section each including discharge port arrays for discharging two types of inks different from each other in permeation rate and the first recording section and the second recording section are arranged away from each other by a degree of distance along the X-direction, beneficial effects similar to those in each exemplary embodiment can be attained by arranging discharge port arrays in each recording section as described in each exemplary embodiment. For example, even when a recording unit which includes no holding portion and includes one recording head in which a first recording section and a second recording section are included is used, beneficial effects of each exemplary embodiment can be attained.

Additionally, the term "ink" refers to liquid serving as a recording agent which is able to be applied onto a recording medium so as to be used to form, for example, an image, a design, and a pattern or to process the recording medium.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)), a flash memory device, a memory card, and the like.

According to an image processing apparatus in each exemplary embodiment of the disclosure, the dot arrangements of an overlapping recording area and a non-overlapping recording area can be set to the mutually same arrangements in a case where there is no discharge position deviation between two recording sections and a difference in dispersiveness of dots between the overlapping recording area and the non-overlapping recording area can be reduced even if a discharge position deviation occurs between two recording sections.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-037740 filed Feb. 28, 2017, which is hereby incorporated by reference herein in its entirety.

What is claimed is:

1. An image processing apparatus that generates recording data with respect to a recording apparatus, the recording apparatus relatively moving a recording unit including a first recording section and a second recording section which are located away from each other along a predetermined direction with respect to a recording medium and, during relative movement of the recording unit, recording an image in a first area on the recording medium by applying a recording agent using the first recording section without using the second recording section and recording an image in a second area on the recording medium by applying a recording agent using the first recording section and by applying a recording agent using the second recording section, the image processing apparatus comprising:

an acquisition unit configured to acquire first multivalued image data of a first color including a plurality of pieces of data having gradation values respectively determined with respect to a plurality of pixels corresponding to an image to be recorded in the first area by the first recording section, second multivalued image data of the first color including a plurality of pieces of data having gradation values respectively determined with respect to a plurality of pixels corresponding to an image to be recorded in the second area by the first recording section, and third multivalued image data of the first color including a plurality of pieces of data having gradation values respectively determined with respect to a plurality of pixels corresponding to an image to be recorded in the second area by the second recording section; and a generation unit configured to generate first recording data to be used by the first recording section for image recording in the first area, second recording data to be used by the first recording section for image recording in the second area, and third recording data to be used by the second recording section for image recording in the second area by quantizing the first multivalued image data, the second multivalued image data, and the third multivalued image data.

2. The image processing apparatus according to claim 1, wherein the generation unit performs quantization processing of the first multivalued image data, the second multivalued image data, and the third multivalued image data using a dither pattern corresponding to a pixel area of a predetermined size and including a plurality of threshold pixels having threshold values respectively determined for the quantization processing with respect to a plurality of pixels configuring the pixel area, and wherein the generation unit generates the first recording data by quantizing the first multivalued image data using a dither pattern having a threshold pixel arrangement in which a number of threshold pixels with threshold values of 1 to j (j being an integer satisfying j>1) in the threshold values determined is equal to a number of threshold pixels with threshold values of k (k being an integer satisfying 2≤k≤M−j+1 where M is a maximum value of the threshold values determined in the dither pattern) to (k+j−1) determined and in which low-frequency components corresponding to a frequency region lower than a predetermined frequency in spatial frequency characteristics corresponding to an arrangement of the threshold pixels with threshold values of 1 to j determined are smaller than low-frequency components corresponding to a frequency region lower than the predetermined frequency in spatial frequency characteristics corresponding to an arrangement of the threshold pixels with threshold values of k to (k+j−1) determined.

3. The image processing apparatus according to claim 2, wherein the generation unit generates the second recording data by quantizing the second multivalued image data using the dither pattern having the threshold pixel arrangement, and wherein the generation unit generates the third recording data by quantizing the third multivalued image data using the dither pattern having the threshold pixel arrangement and the second multivalued image data.

4. The image processing apparatus according to claim 3, wherein the generation unit uses, as the dither pattern used to perform quantization processing, a dither pattern having the same threshold pixel arrangement.

5. The image processing apparatus according to claim 3, wherein the generation unit generates the third recording data by subtracting a value indicated by the second multivalued image data from threshold values determined in a plurality of threshold pixels included in the dither pattern having the threshold pixel arrangement to generate a dither pattern subjected to subtraction and quantizing the third multivalued image data using the dither pattern subjected to subtraction.

6. The image processing apparatus according to claim 3, wherein the generation unit generates the third recording data by adding a value indicated by the second multivalued image data to a value indicated by the third multivalued image data to generate third multivalued image data subjected to addition and quantizing the third multivalued image data subjected to addition using the dither pattern having the threshold pixel arrangement.

7. The image processing apparatus according to claim 3, wherein, in the dither pattern having the threshold pixel arrangement, low-frequency components corresponding to a frequency region lower than the predetermined frequency in spatial frequency characteristics corresponding to an arrangement of the threshold pixels with threshold values of 1 to j determined are substantially zero.

8. The image processing apparatus according to claim 3, wherein, in the dither pattern having the threshold pixel arrangement, spatial frequency characteristics corresponding to an arrangement of the threshold pixels with threshold values of 1 to j determined are blue noise characteristics.

9. The image processing apparatus according to claim 3, wherein the recording apparatus further records an image in a third area on the recording medium by applying the recording agent using the second recording section, the third area being adjacent to the second area along the predetermined direction, wherein the acquisition unit further acquires fourth multivalued image data including a plurality of pieces of data having gradation values respectively determined with respect to a plurality of pixels corresponding to an image to be recorded in the third area by the second recording section, and wherein the generation unit generates fourth recording data to be used by the second recording section for image recording in the third area by quantizing the fourth multivalued image data using the dither pattern having the threshold pixel arrangement.

10. The image processing apparatus according to claim 9, wherein the second area is located between the first area and the third area along the predetermined direction.

11. The image processing apparatus according to claim 3, wherein one of k>j is satisfied, k=j+1 is satisfied and k≥M/16 is satisfied.

12. The image processing apparatus according to claim 3, wherein each of the first recording section and the second recording section includes a plurality of nozzles arrayed along a direction intersecting with the predetermined direction and configured to discharge ink as the recording agent to the recording medium according to the recording data, and wherein the relative movement is performed along the predetermined direction.

13. The image processing apparatus according to claim 12, wherein the relative movement is the recording unit moving over the recording medium along the predetermined direction.

14. The image processing apparatus according to claim 3, wherein each of the first recording section and the second recording section includes a plurality of nozzles arrayed along the predetermined direction and configured to discharge ink as the recording agent to the recording medium according to the recording data, and wherein a part of a range in which the nozzles of the first recording section are arrayed and a part of a range in which the nozzles of the second recording section are arrayed overlap along the predetermined direction.

15. An image processing apparatus that generates recording data with respect to a recording apparatus, the recording apparatus relatively moving a recording unit including a first recording section and a second recording section which are located away from each other along a predetermined direction with respect to a recording medium and, during relative movement of the recording unit, recording an image in a first area on the recording medium by applying a recording agent using the first recording section without using the second recording section and recording an image in a second area on the recording medium by applying a recording agent using the first recording section and by applying a recording agent using the second recording section, the image processing apparatus comprising:

an acquisition unit configured to acquire first multivalued image data of a first color including a plurality of pieces of data having gradation values respectively determined with respect to a plurality of pixels corresponding to an image to be recorded in the first area by the first recording section, second multivalued image data of the first color including a plurality of pieces of data having gradation values respectively determined with respect to a plurality of pixels corresponding to an image to be recorded in the second area by the first recording section, and third multivalued image data of the first color including a plurality of pieces of data having gradation values respectively determined with respect to a plurality of pixels corresponding to an image to be recorded in the second area by the second recording section; and a generation unit configured to generate first recording data to be used by the first recording section for image recording in the first area, second recording data to be used by the first recording section for image recording in the second area, and third recording data to be used by the second recording section for image recording in the second area by quantizing the first multivalued image data, the second multivalued image data, and the third multivalued image data, wherein the generation unit performs quantization processing of the first multivalued image data, the second multivalued image data, and the third multivalued image data using a dither pattern corresponding to a pixel area of a predetermined size and including a plurality of threshold pixels having threshold values respectively determined for the quantization processing with respect to a plurality of pixels configuring the pixel area, wherein the generation unit generates the first recording data by quantizing the first multivalued image data using a dither pattern having a threshold pixel arrangement in which dispersiveness in an arrangement of threshold pixels with threshold values of 1 to j (j being an integer satisfying j>1) in the threshold values determined is higher than dispersiveness in an arrangement of threshold pixels with threshold values of k (k being an integer satisfying 2≤k≤M−j+1 where M is a maximum value of the threshold values determined in the dither pattern) to (k+j−1) determined, wherein the generation unit generates the second recording data by quantizing the second multivalued image data using the dither pattern having the threshold pixel arrangement, and wherein the generation unit generates the third recording data by quantizing the third multivalued image data using the dither pattern having the threshold pixel arrangement and the second multivalued image data.

16. An image processing apparatus that generates recording data used to perform recording using a recording unit including a first recording section and a second recording section each configured to discharge ink of a same color and located away from each other along a predetermined direction in such a manner that a first area in which to perform recording using the first recording section and a second area in which to perform recording using both the first recording section and the second recording section are arranged side by side along the predetermined direction on a recording medium, the image processing apparatus comprising:

an acquisition unit configured to acquire first multivalued data corresponding to an image to be recorded in the first area by the first recording section, second multivalued data corresponding to an image to be recorded in the second area by the first recording section, and third multivalued data corresponding to an image to be recorded in the second area by the second recording section; and a generation unit configured to generate first recording data to be used by the first recording section for recording in the first area, second recording data to be used by the first recording section for recording in the second area, and third recording data to be used by the second recording section for recording in the second area using a dither pattern in which threshold values for defining discharge or non-discharge of ink with respect to respective pixels are determined, wherein the dither pattern has a predetermined characteristic in which a number of threshold pixels with threshold values of 1 to j (j being an integer satisfying j>1) determined is equal to a number of threshold pixels with threshold values of k (k being an integer satisfying 2≤k≤M−j+1 where M is a maximum value of the threshold values determined in the dither pattern) to (k+j−1) determined and in which low-frequency components corresponding to a frequency region lower than a predetermined frequency in spatial frequency characteristics corresponding to an arrangement of the threshold pixels with threshold values of 1 to j determined are smaller than low-frequency components corresponding to a frequency region lower than the predetermined frequency in spatial frequency characteristics corresponding to an arrangement of the threshold pixels with threshold values of k to (k+j−1) determined, and wherein the generation unit (i) generates the first recording data by quantizing the first multivalued data based on a dither pattern for the first multivalued data having the predetermined characteristic, (ii) generates the second recording data by quantizing the second multivalued data based on a dither pattern for the second multivalued data having the predetermined characteristic, and (iii) generates the third recording data by quantizing the third multivalued data based on a dither pattern for the third multivalued data having the predetermined characteristic and the second multivalued data.

17. An image processing apparatus that generates recording data used to perform recording using a recording unit including a first recording section and a second recording section each configured to discharge ink of a same color and located away from each other along a predetermined direction in such a manner that a first area in which to perform recording using the first recording section without using the second recording section and a second area in which to perform recording using both the first recording section and the second recording section are arranged side by side along the predetermined direction on a recording medium, the image processing apparatus comprising:

an acquisition unit configured to acquire first multivalued data corresponding to an image to be recorded in the first area by the first recording section, second multivalued data corresponding to an image to be recorded in the second area by the first recording section, and third multivalued data corresponding to an image to be recorded in the second area by the second recording section; and a generation unit configured to generate first recording data to be used by the first recording section for recording in the first area, second recording data to be used by the first recording section for recording in the second area, and third recording data to be used by the second recording section for recording in the second area using a dither pattern in which threshold values for defining discharge or non-discharge of ink with respect to respective pixels are determined, wherein the dither pattern has a predetermined characteristic in which dispersiveness of pixels with threshold values of 1 to j (j being an integer satisfying j>1) determined is larger than dispersiveness of pixels with threshold values of k (k being an integer satisfying 2≤k≤M−j+1 where M is a maximum value of the threshold values determined in the dither pattern) to (k+j−1) determined, and wherein the generation unit (i) generates the first recording data by quantizing the first multivalued data based on a dither pattern for the first multivalued data having the predetermined characteristic, (ii) generates the second recording data by quantizing the second multivalued data based on a dither pattern for the second multivalued data having the predetermined characteristic, and (iii) generates the third recording data by quantizing the third multivalued data based on a dither pattern for the third multivalued data having the predetermined characteristic and the second multivalued data.

18. An image processing method for generating recording data with respect to a recording apparatus, the recording apparatus relatively moving a recording unit including a first recording section and a second recording section which are located away from each other along a predetermined direction with respect to a recording medium and, during relative movement of the recording unit, recording an image in a first area on the recording medium by applying a recording agent using the first recording section and recording an image in a second area on the recording medium by applying a recording agent using the first recording section and by applying a recording agent using the second recording section, the image processing method comprising:

an acquisition process of acquiring first multivalued image data of a first color including a plurality of pieces of data having gradation values respectively determined with respect to a plurality of pixels corresponding to an image to be recorded in the first area by the first recording section, second multivalued image data of the first color including a plurality of pieces of data having gradation values respectively determined with respect to a plurality of pixels corresponding to an image to be recorded in the second area by the first recording section, and third multivalued image data of the first color including a plurality of pieces of data having gradation values respectively determined with respect to a plurality of pixels corresponding to an image to be recorded in the second area by the second recording section; and a generation process of generating first recording data to be used by the first recording section for image recording in the first area, second recording data to be used by the first recording section for image recording in the second area, and third recording data to be used by the second recording section for image recording in the second area by quantizing the first multivalued image data, the second multivalued image data, and the third multivalued image data, wherein the generation process performs quantization processing of the first multivalued image data, the second multivalued image data, and the third multivalued image data using a dither pattern corresponding to a pixel area of a predetermined size and including a plurality of threshold pixels having threshold values respectively determined for the quantization processing with respect to a plurality of pixels configuring the pixel area, wherein the generation process generates the first recording data by quantizing the first multivalued image data using a dither pattern having a threshold pixel arrangement in which a number of threshold pixels with threshold values of 1 to j (j being an integer satisfying j>1) in the threshold values determined is equal to a number of threshold pixels with threshold values of k (k being an integer satisfying 2≤k≤M−j+1 where M is a maximum value of the threshold values determined in the dither pattern) to (k+j−1) determined and in which low-frequency components corresponding to a frequency region lower than a predetermined frequency in spatial frequency characteristics corresponding to an arrangement of the threshold pixels with threshold values of 1 to j determined are smaller than low-frequency components corresponding to a frequency region lower than the predetermined frequency in spatial frequency characteristics corresponding to an arrangement of the threshold pixels with threshold values of k to (k+j−1) determined, wherein the generation process generates the second recording data by quantizing the second multivalued image data using the dither pattern having the threshold pixel arrangement, and wherein the generation process generates the third recording data by quantizing the third multivalued image data using the dither pattern having the threshold pixel arrangement and the second multivalued image data.

19. An image processing method for generating recording data with respect to a recording apparatus, the recording apparatus relatively moving a recording unit including a first recording section and a second recording section which are located away from each other along a predetermined direction with respect to a recording medium and, during relative movement of the recording unit, recording an image in a first area on the recording medium by applying a recording agent using the first recording section without using the second recording section and recording an image in a second area on the recording medium by applying a recording agent using the first recording section and by applying a recording agent using the second recording section, the image processing method comprising:

an acquisition process of acquiring first multivalued image data of a first color including a plurality of pieces of data having gradation values respectively determined with respect to a plurality of pixels corresponding to an image to be recorded in the first area by the first recording section, second multivalued image data of the first color including a plurality of pieces of data having gradation values respectively determined with respect to a plurality of pixels corresponding to an image to be recorded in the second area by the first recording section, and third multivalued image data of the first color including a plurality of pieces of data having gradation values respectively determined with respect to a plurality of pixels corresponding to an image to be recorded in the second area by the second recording section; and a generation process of generating first recording data to be used by the first recording section for image recording in the first area, second recording data to be used by the first recording section for image recording in the second area, and third recording data to be used by the second recording section for image recording in the second area by quantizing the first multivalued image data, the second multivalued image data, and the third multivalued image data, wherein the generation process performs quantization processing of the first multivalued image data, the second multivalued image data, and the third multivalued image data using a dither pattern corresponding to a pixel area of a predetermined size and including a plurality of threshold pixels having threshold values respectively determined for the quantization processing with respect to a plurality of pixels configuring the pixel area, wherein the generation process generates the first recording data by quantizing the first multivalued image data using a dither pattern having a threshold pixel arrangement in which dispersiveness in an arrangement of threshold pixels with threshold values of 1 to j (j being an integer satisfying j>1) in the threshold values determined is higher than dispersiveness in an arrangement of threshold pixels with threshold values of k (k being an integer satisfying 2≤k≤M−j+1 where M is a maximum value of the threshold values determined in the dither pattern) to (k+j−1) determined, wherein the generation process generates the second recording data by quantizing the second multivalued image data using the dither pattern having the threshold pixel arrangement, and wherein the generation process generates the third recording data by quantizing the third multivalued image data using the dither pattern having the threshold pixel arrangement and the second multivalued image data.

* * * * *